US012042948B2

United States Patent
Ottnad et al.

(10) Patent No.: US 12,042,948 B2
(45) Date of Patent: Jul. 23, 2024

(54) EVALUATING WORKPIECE POSITIONS IN NESTED ARRANGEMENTS

(71) Applicant: TRUMPF Werkzeugmaschinen GmbH + Co. KG, Ditzingen (DE)

(72) Inventors: Jens Ottnad, Karlsruhe (DE); Manuel Kiefer, Sinsheim (DE); Raphael Rahaeuser, Stuttgart (DE); Daniel Selzam, Stuttgart (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 511 days.

(21) Appl. No.: 17/232,164

(22) Filed: Apr. 16, 2021

(65) Prior Publication Data

US 2021/0229308 A1 Jul. 29, 2021

Related U.S. Application Data

(63) Continuation of application No. PCT/EP2019/078368, filed on Oct. 18, 2019.

(30) Foreign Application Priority Data

Oct. 19, 2018 (DE) ............ 10 2018 126 077.6

(51) Int. Cl.
*B26D 5/00* (2006.01)
*B23K 37/04* (2006.01)
*B26D 5/34* (2006.01)

(52) U.S. Cl.
CPC ......... *B26D 5/007* (2013.01); *B23K 37/0408* (2013.01); *B26D 5/34* (2013.01); *G05B 2219/35162* (2013.01)

(58) Field of Classification Search
CPC ...... B26D 5/007; B26D 5/34; B23K 37/0408; B23K 2101/18; B23K 26/0869;
(Continued)

(56) References Cited

U.S. PATENT DOCUMENTS

| 5,748,762 A | 5/1998 | Guez |
| 8,455,787 B2 | 6/2013 | Takada |

(Continued)

FOREIGN PATENT DOCUMENTS

| CN | 105740953 A | 7/2016 |
| CN | 206747802 U | 12/2017 |

(Continued)

OTHER PUBLICATIONS

Liu, et al., "Algorithm for 2D Irregular-Shapes Nesting Problem Based on the NFP Algorithm and Lowest-Gravity-Center Principle," *Journal of Zhejiang University—Science A*, 7, 4, pp. 570-576, Apr. 2006, Zhejiang University Press and Springer Science+ Business Media, Hangzhou, China.

(Continued)

*Primary Examiner* — Charles Cai
(74) *Attorney, Agent, or Firm* — LEYDIG, VOIT & MAYER, LTD.

(57) ABSTRACT

A method for evaluating a position of a selected sub-space of a nesting plan is provided. The nesting plan is provided for controlling a cutting process of a flatbed machine tool for cutting out workpieces from a material sheet and includes an overlap-free arrangement of respective sub-spaces, the respective sub-spaces corresponding to the workpieces. The method includes providing contour data specifying a cutting contour that delimits the selected sub-space in the position to be evaluated within the planning space, and providing position data indicating respective positions in the planning space of spaces to be considered in the evaluation. The (Continued)

spaces include a group of supported spaces and a group of support surrounding spaces. The method includes providing cutting operation data for at least one section and determining an evaluation value for the position to be evaluated of the selected sub-space using the calculated damage rate of the cutting contour.

18 Claims, 8 Drawing Sheets

(58) Field of Classification Search
CPC ............... B23K 26/38; B23K 37/0235; G05B 2219/35162; G05B 2219/31077; G05B 2219/36199; G05B 2219/45036; G05B 2219/45041; G05B 19/4065
See application file for complete search history.

(56) References Cited

U.S. PATENT DOCUMENTS

| | | | |
|---|---|---|---|
| 2002/0072824 | A1 | 6/2002 | Susnjara |
| 2004/0016731 | A1 | 1/2004 | Erlenmaier |
| 2005/0122346 | A1 | 6/2005 | Horn |
| 2007/0270996 | A1 | 11/2007 | Roise |
| 2010/0064870 | A1 | 3/2010 | Olsen |
| 2012/0109352 | A1* | 5/2012 | Himeno ........... G05B 19/40932 700/103 |
| 2017/0024497 | A1 | 1/2017 | Fu et al. |
| 2017/0115656 | A1 | 4/2017 | Kiefer et al. |
| 2021/0138589 | A1* | 5/2021 | Bader ................ G05B 19/4061 |

FOREIGN PATENT DOCUMENTS

| | | |
|---|---|---|
| DE | 102012212566 A1 | 1/2014 |
| DE | 102014213518 A1 | 1/2016 |
| DE | 102018126069 B3 | 10/2019 |
| DE | 102018124146 A1 | 4/2020 |
| EP | 1340584 B1 | 7/2006 |
| EP | 2029313 A1 | 3/2009 |
| EP | 2029314 A1 | 3/2009 |
| EP | 2029316 A1 | 3/2009 |
| EP | 2441547 A1 | 4/2012 |
| JP | H07299682 A | 11/1995 |
| JP | H09271977 A | 10/1997 |
| WO | WO 2005047998 A1 | 5/2005 |
| WO | 2007134628 A1 | 11/2007 |
| WO | 2007134631 A1 | 11/2007 |
| WO | WO 2007134630 A1 | 11/2007 |
| WO | WO 2020078765 A1 | 4/2020 |

OTHER PUBLICATIONS

Egeblad, et al., "Fast Neighborhood Search for Two- and Three-Dimensional Nesting Problems," *European Journal of Operational Research*, 183, 3, pp. 1249-1266, Dec. 2007, Elsevier, Amsterdam, Netherlands.
Dewil, et al., "A Review of Cutting Path Algorithms for Laser Cutters," *D. Int J Adv Manuf Technol*, 87, 5-8, pp. 1865-1884, Dec. 2016, Springer Science+Business Media, New York, USA.
Junior, et al., "A Hybrid Methodology for Nesting Irregular Shapes: Case Study on a Textile Industry," *IFAC Proceedings*, 46, 24, pp. 15-20, Dec. 2013, IFAC Publisher, Lasenburg, Austria.
Bystronic Laser AG, "More Safety in the Laser Cutting Process," www.bystronic.com, pp. 1-4, Feb. 2019, Bystronic Laser AG, Niederoenz, Switzerland.
Struckmeier, et al., "Nesting in the Sheet Metal Industry: Dealing with Constraints of Flatbed Laser-Cutting Machines," *Procedia Manufacturing*, 29, pp. 575-582, Dec. 2019, Elsevier, Amsterdam, Netherlands.
Francis, et al., "State of the art of Nesting," *International Research Journal of Engineering and Technology*, 4, 6, pp. 2048-2054, Jun. 2017, Fast Track Publications, Tamilnadu, India.
Dowsland, et al., "An Algorithm for Polygon Placement Using a Bottom-Left Strategy," *European Journal of Operational Research* 141, 2, pp. 371-381, Dec. 2002, Elsevier, Amsterdam, Netherlands.
MTC Software, "ProNest 8.0 User Manuel," www.scribd.com, pp. 1-267, Oct. 2006, MTC Software, Lockport NY, USA.
Xie, et al., "Nesting of Two-Dimensional Irregular Parts: an Integrated Approach," *International Journal of Computer Integrated Manufacturing*, 20, 8, pp. 741-756, Dec. 2007, Taylor & Francis, Boca Raton FL, USA.
Yunqing, et al., "An Improved Hierarchical Genetic Algorithm for Sheet Cutting Scheduling with Process Constraints," *The Scientific World Journal*, 6, 2, pp. 1-10, Jan. 2013, Hindawi Publishing Corporation, Cairo, Egypt.
Wodziak, et al., "A Genetic Algorithm for Optimizing Multiple Part Placement to Reduce Build Time," pp. 1-14, Jan. 1994, Clemson University, Clemson SC, USA.
Sherif, et al., "Sequential Optimization Approach for Nesting and Cutting Sequence in Laser Cutting," *Journal of Manufacturing Systems*, 33, 4, pp. 624-638, Dec. 2014, World Scientific Publishing Co., Singapore.
Poshyanonda, et al., "Two Dimensional Nesting Problem: Artificial Neural Network and Optimization Approach," Proceedings of 1992 International Joint Conference on Neural Networks, 4, pp. IV 572-IV 577, Dec. 1992, IEEE, USA.
Hopper, "Two-Dimensional Packing Utilising Evolutionary Algorithms and Other Meta-Heuristic Methods," Thesis, pp. 1-80, May 2000, University of Wales, Cardiff, Wales.
Ratanapan, et al., "An Object-Based Evolutionary Algorithm for Solving Nesting Problems," *International Journal of Production Research*, 45, 4, pp. 845-869, Feb. 2007, Taylor & Francis, Boca Raton FL, USA.
Poshyanonda, et al., "Genetic Neuro-Nester," *Journal of Intelligent Manufacturing*, 15, pp. 201-218, Dec. 2004, Kluwer Academic Publishers, Dordrecht, Netherlands.
Bennell; et al., "The Geometry of Nesting Problems: A Tutorial," *European Journal of Operational Research*, 184, pp. 397-415, Dec. 2008, Elsevier, Amsterdam, Netherlands.

\* cited by examiner

EVALUATING WORKPIECE POSITIONS IN NESTED ARRANGEMENTS

CROSS-REFERENCE TO PRIOR APPLICATIONS

This application is a continuation of International Patent Application No. PCT/EP2019/078368, filed on Oct. 18, 2019, which claims priority to German Patent Application No. DE 10 2018 126 077.6, filed on Oct. 19, 2018. The entire disclosure of both applications is hereby incorporated by reference herein.

FIELD

The present invention relates to nestings of workpieces to be cut with a flatbed machine tool from a raw material sheet, in particular to a method for evaluating a nesting plan for a control of a cutting process of a flatbed machine tool, e.g., a flatbed laser cutting machine tool. Furthermore, the invention relates to a method for evaluating a workpiece position in a nesting plan.

BACKGROUND

A nesting herein refers to the positioning of workpieces on a raw material sheet (as the starting sheet of a laser cutting process). In the sheet metal processing industry, nesting of workpieces, which are to be cut on a raw material sheet, is part of the production process, wherein the nesting results in a specific layout of cutting lines. Herein, the result of nesting in the planning and cutting phase is also called a nesting plan, according to which the workpieces are cut along cutting lines.

Such two-dimensional (2D) nesting problems are solved—in particular for flatbed laser cutting machines—primarily for minimizing the raw material to be used because the raw material usually accounts for a significant portion of the total cost. However, other aspects are also be taken into account. For example, in flatbed laser cutting machines tools, the relative position of the workpiece contours to be processed with respect to support bars (also referred to simply as "bars") of the machine tool is often unknown. As a result, cutting operations over the bars can result in reduced quality of the pieces as well as severe wear of the bar. Due to unstable support of the pieces on bars, unexpected tilting of the pieces and disturbances of the process can also be caused. In this context, for example, US 2012/0109352 A1 discloses a method for generating nesting data while avoiding an overlap of a cutting path with support projections, in particular to reduce damage to the support. Furthermore, CN 105740953 A discloses a workpiece nesting, e.g., for punching operations, based on a quantum evolutionary algorithm. Furthermore, EP 1 340 584 B1, EP 2 029 313 B1, and EP 2 029 314 B1 disclose to perform a collision check between the course of the cutting contour and support tips. The arrangement of the support tips is determined based on the result or support bars are displaced. Furthermore, EP 2 029 313 A1 discloses an optimization of a workpiece support with regard to the wear of support point tips and a guarantee of a finished and residual part deposition.

JP H 07299682 A discloses the use of a detection device to detect whether a cutting path collides with a support pin. If this is the case, this support pin is removed (lowered). Furthermore, U.S. Pat. No. 9,031,688 B2 and U.S. Pat. No. 8,455,787 B2 disclose the calculation of a tipping probability by means of the center of mass of workpieces, and in JP H 09271977 A, it is disclosed to check on a monitor whether parts, which are to fall freely, lie on support pins.

"The geometry of nesting problems: A tutorial," by J. A. Bennell et. al, European Journal of Operational Research 184 (2008) 397-415 has information on nesting approaches, especially for nonfit polygons.

SUMMARY

In an embodiment, the present invention provides a method for evaluating a position of a selected sub-space of a nesting plan. The nesting plan is provided for controlling a cutting process of a flatbed machine tool for cutting out workpieces from a material sheet. The nesting plan including an overlap-free arrangement of respective sub-spaces, the respective sub-spaces corresponding to the workpieces, in a two-dimensional planning space and an arrangement of predetermined supported spaces and support surrounding spaces, the supported spaces corresponding to respective support surface areas of the material sheet, which are supported during the cutting process. The method includes providing contour data specifying a cutting contour that delimits the selected sub-space in the position to be evaluated within the planning space, and providing position data indicating respective positions in the planning space of spaces to be considered in the evaluation. The spaces include a group of supported spaces and a group of support surrounding spaces. The method further includes providing cutting operation data indicating a type of cutting operation for at least one section of the cutting contour. The method additionally includes determining cumulative contour section lengths using the position data, the contour data, and the cutting operation data. Each of the cumulative contour section lengths indicates, for a type of cutting operation and a group of spaces, a cumulative length of sections of the cutting contour, the sections each lying within the corresponding group of spaces. The method also includes calculating a damage rate for the respective cutting contour in the position to be evaluated by combining the contour section lengths in a weighted manner with weight factors, the weight factors defining a damage probability depending on the respective group of spaces and the respective type of cutting operation. The method further includes determining an evaluation value for the position to be evaluated of the selected sub-space using the calculated damage rate of the cutting contour.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
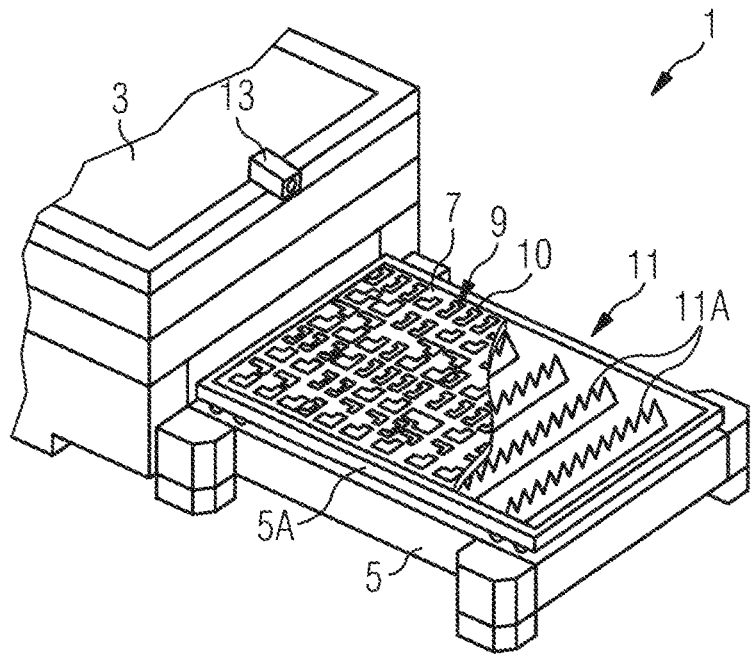
FIG. 1 a schematic spatial representation of a flatbed machine tool.

An aspect of the present disclosure provides a nesting plan for a plurality of workpieces to be cut that has a reduced damage rate to workpieces and/or support bars. According to another aspect of the present disclosure, a nesting plan is provided for a plurality of workpieces to be cut that has a reduced tilt rate and/or an improved slug fall. As used herein, a 'slug' is understood to mean a waste piece that corresponds to an interior portion, which is cut out of a workpiece or generally the sheet.

One aspect of the present disclosure relates to a method for evaluating a position of a sub-space of a nesting plan. The nesting plan is provided for controlling a cutting process of a flatbed machine tool for cutting workpieces from a material sheet and the nesting plan includes an overlap-free arrangement of sub-spaces, which correspond to the workpieces, in a two-dimensional planning space and an arrangement of predetermined supported spaces and support surrounding spaces. The supported spaces correspond to support surface regions of the material sheet that are supported during the cutting process. The method includes the steps of:
  providing:
    contour data specifying a cutting contour that delimits the sub-space in the position to be evaluated in the planning space,
    position data indicating the positions in the planning space of spaces to be considered in the evaluation, wherein the spaces include a group of supported spaces and a group of support surrounding spaces; and
    cutting operation data indicating a type of cutting operation for at least one section of the cutting contour;
  determining cumulative contour section lengths using the position data, the contour data, and the cutting operation data, wherein each of the cumulative contour section lengths indicates, specifically for a type of cutting operation and a group of spaces, a cumulative length of the sections of the cutting contour, the sections each lying within the corresponding group of spaces;
  calculating a damage rate for the cutting contour in the position to be evaluated by combining the contour section lengths in a weighted manner with weight factors, the weight factors defining a damage probability depending on the respective group of spaces and the respective type of cutting operation; and
  determine an evaluation value for the position to be evaluated of the sub-space using the calculated damage rate of the cutting contour.

A further aspect relates to a method for determining a nesting plan of sub-spaces, the nesting plan being improved with respect to a cutting process, in particular being improved with respect to damages and quality, wherein evaluation values for positions of the sub-spaces in the nesting plan are calculated according to the method described above.

In another aspect, a method for determining a nesting plan includes the steps of:
  placing the material sheet on the bar tips of a pallet of the flatbed machine tool and determining position data of the material sheet with respect to the pallet;
  detecting positions of the support bars and/or the bar tips with respect to the pallet and/or the material sheet in order to provide position data of spaces in the planning space to be considered in the evaluation, wherein
    regions above bar tips are assigned to supported spaces corresponding to support surface areas of the material sheet,
    regions above bar depressions are assigned to support overlay spaces, wherein the bar depressions can optionally be further subdivided into regions of bar tip flanks and bar tip sinks to which near and far support overlay spaces are assigned, and
    border regions, which laterally adjoin a support bar and extend next to a support bar along the bar tip and optionally along the bar depression are assigned support clearance spaces;
  providing arrangement data relating to the arrangement of the planning space on the material sheet, in particular the coordinate system of the material sheet or the pallet; and
  determining of the nesting plan by positioning the sub-spaces in positions R evaluated according to the method described above.

In another aspect, a manufacturing method for cutting out workpieces with a flatbed machine tool according to workpiece-specific cutting contours from a sheet of material includes the steps of:
  performing the method described above in real time during operation of the flatbed machine tool, wherein the calculations to determine the improved nesting plan are performed by a local and/or cloud-based manufacturing control system; and
  performing the cutting operation based on the improved nesting plan.

In another aspect, a manufacturing system includes a flatbed machine tool for cutting workpieces according to workpiece-specific cutting contours from a sheet of material, and a local and/or cloud-based manufacturing control system for performing the method described above in real time during operation of the flatbed machine tool to provide it with a nesting plan improve with respect to a cutting process of the flatbed machine tool.

Further aspects include a computer program (or computer program product) and a computer-readable medium on which a corresponding computer program is stored. The computer program/computer program product comprises instructions which, when the program is executed by a computer, in particular by a computer-implemented controller for operating a flatbed machine tool or a planning unit, cause the computer/controller to execute/cause the procedures described herein for generating or evaluating a (cutting process-oriented) nesting plan or methods for evaluating a workpiece position in a nesting plan.

The computer program/computer program product and the computer-readable medium are accordingly provided for carrying out one of the aforementioned method steps, in particular all those method steps which, on the basis of their subject matter, can be executed by corresponding computer program instructions and/or routines. The computer program may be stored on a non-volatile memory used in particular as part of a controller for operating a flatbed machine tool or a planning unit.

In some embodiments, the flatbed machine tool includes a pallet for supporting the material sheet, the pallet having a plurality of support bars, each having a plurality of bar tips. The support surrounding spaces may include support overlay spaces corresponding to regions of the material sheet that overlie a support bar during the cutting process, and support clearance spaces, which correspond to regions of the material sheet that do not overlie a support bar during the cutting process. The method may then further include the steps of:
- subdividing the cutting contour into sections that lie in a support overlay space and sections that lie in a support clearance space;
- determining a contour section length for each of the support overlay spaces and the support clearance spaces using the position data, the contour data, and the cutting operation data; and
- include the contour section length for the support overlay spaces and the support clearance spaces in the calculation of the damage rate for the cutting contour with appropriate weight factors.

In some embodiments, the step of providing the position data may include detecting positions of support bars and/or of bar tips of a pallet that is provided for use with the flatbed machine tool and that provides a support area in which the material sheet may be supported. In this regard, regions over bar tips may be associated with supported spaces and regions over bar depressions may be associated with support overlay spaces. The bar depressions can optionally be further subdivided into regions of bar tip flanks and bar tip sinks, to which correspondingly near and far support overlay spaces are assigned. Furthermore, border regions, which laterally adjoin a support bar and extend alongside a support bar along the bar tip and optionally along the bar depression, can be assigned to support overlay spaces.

The method may further include placing a material sheet on the pallet and determining position data of the material sheet with respect to the pallet, wherein a spatial arrangement of the material sheet is used to derive the planning space in which the supported spaces, support overlay spaces, and support clearance spaces are defined.

In some embodiments, sections of the cutting contour or positions along the cutting contour can be assigned to the groups of spaces using the position data, and the evaluation value of the to be evaluated position of the sub-space can be determined depending on the extent of the assigned sections of the cutting contour or positions along the cutting contour, in particular depending on the cumulative contour section length for the supported space. Additional supported spaces can be provided in the planning space, and—using the position data—sections of the cutting contour or positions along the cutting contour can be assigned to the additional supported spaces to evaluate the to be evaluated position of the sub-space. Cumulative contour section lengths can be determined for the support spaces depending on the extent of the sections of the cutting contour or positions along the cutting contour assigned to the supported additional spaces. The cumulative contour section lengths of the support spaces and the additional supported spaces can be combined with weights to obtain the evaluation value for the to be evaluated position of the sub-space.

The method may further include providing incision data associated with the cutting contours indicating an incision process and optionally an approaching process for the cutting contour, and cutting operation data for the incision process and optionally the approaching process.

Further, the method may include determining the number of incisions (as a value of a contour section length corresponding to the incision process) and optionally an approaching section length for the groups of spaces, respectively, using the position data, the incision data, and the cutting operation data, and including the numbers of incisions and optionally the approaching section length in the calculation of the damage rate for the cutting contour with corresponding weight factors.

In some embodiments, a quality evaluation of the workpiece may be performed that is included in the evaluation value for the to be evaluated position of the sub-space and depends on the contour section length for the supported spaces. In some embodiments, a tilt evaluation may further be performed that is included in the evaluation value for the to be evaluated position of the sub-space and that includes a calculation of distances between a center of gravity of the sub-space and supported spaces that overlap with the sub-space.

In general, a sub-space may have an outer contour and a closed inner contour, which lies within the outer contour. Accordingly, an overlap evaluation can further be performed for the inner contour, which is included in the evaluation value for the to be evaluated position of the sub-space and which includes a calculation of an overlap of the inner contour with supported spaces and optionally with support overlay spaces.

In general, positioning of sub-spaces can be done in positions F locations and/or orientations in the planning space, which differ in predetermined variation ranges. Sub-spaces can be positioned in positions to be evaluated by shifting and/or rotating sub-spaces in the planning space, by varying the arrangement of the planning space on the material sheet, in particular in the coordinate system of the material sheet or of the pallet, by varying position data of the material sheet with respect to the pallet, by varying and incision position of an incision process and/or an approach cut line of an approaching process for at least one sub-space and/or by exchanging positions of two sub-spaces in the planning space.

In general, the weight factors may depend on an energy input value that occurs in a cutting process according to the cutting plan into a support bar in the region of the bar tips. In particular, a weight factor may be maximum for a cutting process in a space above a bar tip, and lower weight factors may be provided respectively for a cutting process above a bar tip flank, for a cutting process above a bar tip sink, and for a cutting process in the border region.

The concepts described herein can be advantageous in terms of reduced wear of the support bars, an increase in part quality, a reduction in scrap pieces, and shorter cutting times. Furthermore, increased process reliability can be achieved, accompanied by reduced maintenance work. In general, the costs of the cutting process can be reduced or even minimized by the nesting achieved.

Advantages of the invention may include:
- minimization of wear on the support bars because incisions over support bars, in particular over bar tips, can be avoided and cutting contour sections that run over and along support bars can be reduced.
- an increase in productivity due to reduction or avoidance of incision processes over bar tips because a longer incision time may be required over bar tips or it may be necessary to abort the incision process.
- a forecast model for the expected usage time of support bars becomes possible.
- a scalable implementation of an online improvement of nesting processes, where computing power for, e.g., online computations can be provided via cloud service.
- an automatic recognition of the bar installation of any bar strip assembly.
- a reduction of tilting parts and of corresponding process disturbances.
- a robust and meaningful model for tilt estimation by incorporating knowledge about relative positions between bar tips and workpieces.
- optional more reliable automatic separation of workpiece and slugs.

In laser cutting, workpieces can be nested in such a way that the highest possible material utilization is achieved and, accordingly, the amount of waste material becomes low.

Concepts described herein are partly based on the realization that, depending on the position of the workpieces on the pallet, for example, there can be a determinable wear on support bars, for example, during incision and cutting. It was also recognized that, during the planning phase, nesting can be evaluated in terms of welding or flying away of slugs, tilting of parts, and collisions of a cutting head with cut material. The inventors have recognized that at least some of these constraints linked to the cutting process relate to the relative position of the raw sheet (and thus the cutting lines distributed on the raw sheet) with respect to the supporting points of the support bars.

The concepts described herein can allow nesting to respond to predetermined support bar configurations and, thereby, to produce low-damage and low-loss nesting.

The concepts disclosed herein are based on a relative position of generated workpieces with respect to support bars being providable by detecting the bar positions as well as the positions of the bar tips by existing sensor technology for the nesting processes. With the knowledge of the (to be expected) positions of the workpieces to be produced on the material sheet, the intersections between cutting contours and bars in a planning space can be determined. In this way, bar wear and workpiece quality can be estimated and, optionally, possible tilting of the workpieces can also be estimated. Based on this information, the positions of the workpieces to be generated can be adjusted in such a way that the problems described are reduced.

It was also recognized that, in addition to damage due to overlap, wear can be evaluated using other parameters, such as the path energy. Likewise, the risk of contamination of workpieces due to cutting line courses above the bars can be detected even before cutting begins.

Herein, path energy means the energy that is transferred to a material over a specified path. The path energy with respect to a material sheet is therefore the energy that is introduced into the material sheet over a specified path. The path energy with respect to a support bar is therefore the energy that is introduced into the support bar within a specified path. The path energy depends on the laser power, feed rate, spectrum and focusing of the laser, properties of the workpiece to be cut, sheet metal, in particular material, thickness, absorption properties, scattering properties, distance of the workpiece or support bar from the laser emitter and many other factors. Furthermore, the path energy introduced into a support bar may depend on the length of a section of the cutting line that runs in a corresponding region (e.g., the supported area of the material sheet on the support bar); in the planning space, this corresponds to the respective contour section lengths in the associated spaces.

The evaluation procedures proposed herein can allow such problems to be overcome by suitable strategies during nesting. One way to do this is to selectively move or reposition workpieces on the sheet or in the planning space. The strategies are scalable; i.e., a shift and/or rotation of the entire material sheet up to a new placement (re-nesting) of all workpieces with improved positions with regard to criteria such as cutting contour on bar tip, cutting contour above the bar, incision above by, stability criteria to avoid tilting, placement of slugs without support for falling out after free cutting are possible measures. Thus, based on suitable algorithms, a damage rate, a tilting probability or a slug drop probability can be estimated, evaluated, and improved according to desired metrics.

For example, (re)nesting may be accomplished by methods as disclosed in German patent application number 10 2018 124 146 entitled "SCHACHTELN VON WERKSTÜCKEN FÜR SCHNEIDPROZESSE EINER FLACHBETTWERKZEUG-MASCHINE" filed by the applicant with a filing date of Sep. 26, 2018 and application number 10 2018 124 146. Said patent application is incorporated herein by reference in its entirety.

In a further embodiment, by estimating, calculating, determining, and/or recording the path energy over each bar and/or bar tip, a forecast of the condition of support bars can be obtained. This can also improve the previously described solution for interpolation because cumulative values of the parts energy can be taken into account as the load on the bar and their degree of wear. For example, from a certain level of wear of the bar tip, this bar tip can no longer be taken into account as a stability criterion in the tilt calculation, so that, for example, a robustness of the tilt calculation can be further increased.

The concepts proposed herein assume, inter alia, that the positions of the supported points to be taken into account (supported areas of the material sheet, in particular support surface areas of the underside of the material sheet) are known when a nesting plan is generated or can at least be set for a cutting process in such a way that they can be adapted to predetermined positions on which the planning is based.

Nesting methods, which propose nesting of workpieces on a pallet, can be based on evolutionary algorithms. The process-oriented nesting methods proposed herein can also be implemented as evolutionary algorithms. In this case, the evaluation of a position of a sub-space takes into account properties of a cutting process that are relevant for the damage. For example, the position of the pieces relative to the support bars of a pallet and the position of the incision points can be included in the evaluation.

The methods proposed herein can be incorporated into the cutting process in such a way that required manufacturing process data is read in or derived initially when a material sheet is placed on a pallet, for example. The relative positions of the supported spaces relative to the material sheet can be determined during operation, for example. This can be done, for example, with a sensor system of the flatbed machine tool, in particular a capacitive distance sensor system for distance detection between the nozzle of the flatbed machine tool and the material sheet. In general, at least a subset of the support bars and/or the bar tips can be detected and optionally the positions of non-detected support bars and/or bar tips can be calculated by interpolation. Further measurement methods are based, for example, on an optical sensor system based on at least one of the following methods: image processing methods based on an area image acquisition, a laser light section method, a strip light projection method, a light field camera, a 3D camera, for example, a time-of-flight-(TOF-) camera, in particular for distance- and/or depth-detection of bar depressions, the condition detection of the geometric shape for an accompanying assessment of wear of a support bar and/or a bar tip, and/or on an ultrasonic sensor system, which uses ultrasonic sensors, in particular on a cutting head of the flatbed machine tool.

Furthermore, the methods proposed herein may be based on fixed/pre-determined relative positions of the supported areas relative to the planning sheet, wherein the generation of the nesting plans and in particular the evaluations incorporating the position data are made based on the fixed/pre-determined relative positions. For the manufacturing process, it is then necessary to ensure the fixed/pre-determined relative positions of the supported areas relative to the nesting plans transferred to the material sheet. I.e., for example, the positions of the support areas can be recorded with respect to a material sheet, and the nesting plan (or the planning space) can be aligned according to the specified/pre-determined relative positions of the support areas on the material sheet.

In the previously mentioned approaches, the relative positions are respectively known and represent input parameters, which in turn can be adjustable and accordingly represent a further degree of freedom in the process-oriented nesting.

Figure 2:
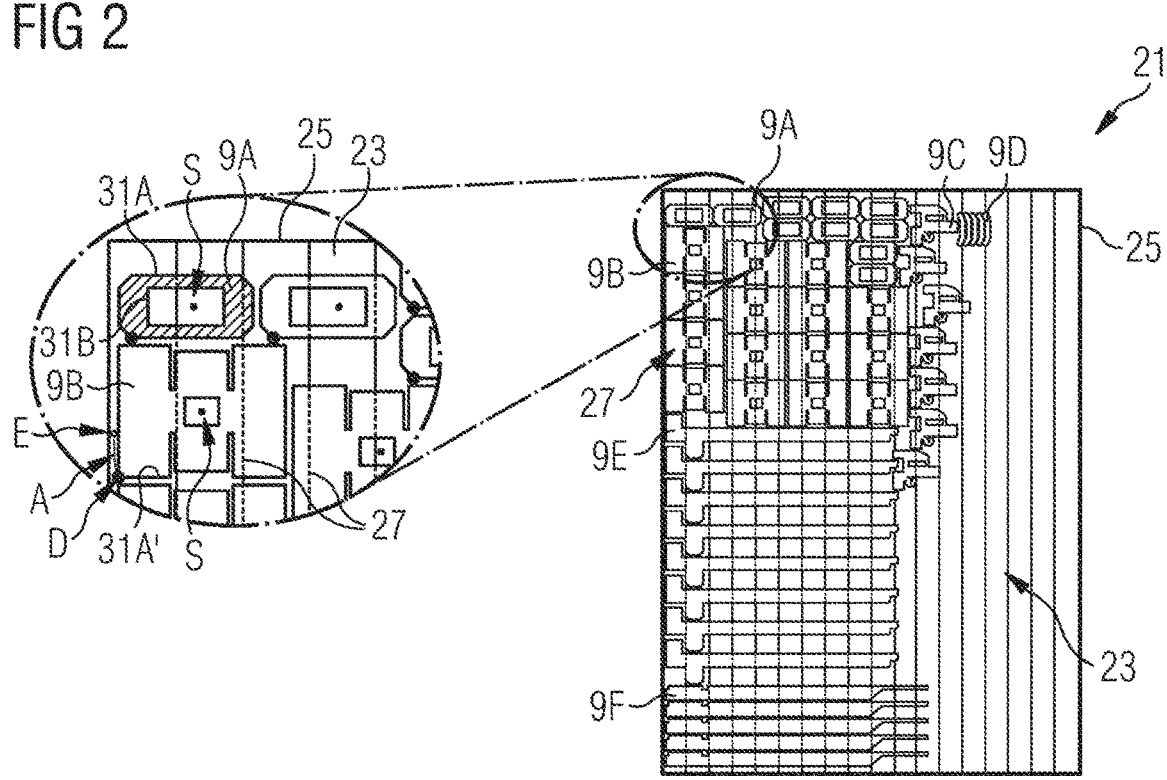
FIG. 2 a schematic representation of a nesting plan.

In the following, the generation of workpieces with a flatbed laser cutting machine is first explained and this generation is brought into relation with nesting plans (FIGS. 1 and 2). A method for generating a nesting plan is then described in connection with FIG. 3, wherein the FIGS. 4A to 4C sketch exemplary option for correction of positions of sub-spaces with respect to position data that represents a bar arrangement. A method for generating a nesting plan with an evolutionary algorithm is explained in connection with FIG. 5. Finally, an exemplary evaluation approach of a nesting plan with regard to the influence of support bars on the cutting process of a material sheet, in particular of supported spaces in the planning space, is presented in connection with FIGS. 6 to 13.

A schematic flatbed machine tool 1 shown in FIG. 1 includes a main housing 3 in which the cutting process is performed with a laser beam. In particular, a focus of the laser beam is guided by a control system along predetermined cutting lines arranged in a processing area over a material in order to cut workpieces with specific shapes from, for example, a substantially two-dimensionally extending sheet metal.

Furthermore, the flatbed machine tool 1 includes a pallet changer 5. The pallet changer 5 is configured to position one or more pallets during manufacture. On a pallet 5A, a material sheet to be cut (as raw material or starting material) can be supported and introduced into the main housing 3 for the cutting operation. After the cutting process is completed, the pallet 5A can be moved out of the main housing 3 with a cut material sheet 7, as shown in FIG. 1, so that the cut workpieces 9 can be picked.

In the main housing 3, the laser processing head from which the laser beam emerges can be freely positioned in the processing area so that the laser beam can be guided essentially along any two-dimensional cutting lines over the material sheet to be cut. During laser cutting, the laser beam heats the metal along the cutting line until it melts. A jet of gas, usually nitrogen or oxygen, exits the laser processing head usually in the area of the laser beam and forces the molten material down and out of the gap that forms. The material sheet 7 is thus completely severed by the laser beam during cutting.

To cut out a workpiece 9, the laser beam is moved along a cutting line 10. The cutting line 10 usually starts at an incision point E, which can be located outside the workpiece 9, and then approaches the contour of the workpiece 9, in particular in an arc (the so-called initial cutting A). The point where the cutting line first touches the contour of the workpiece is the point where the cut is later completed (assuming a continuous cutting process). This point is called the pressure point D because it is the point at which the exiting gas jet exerts a pressure on the cut piece; specifically, at the point in time, when the piece is free to move for the first time. Particularly in the case of thin material sheets, the gas pressure can cause the workpiece to tilt, potentially causing a portion of the workpiece to protrude out of the plane of the metal sheet and collide with the cutting head, for example.

In the embodiment shown, the pallet 5A has several support bars 11 running transverse to the intake-direction and aligned parallel to each other. By way of example, the support bars 11 have a spacing of 20 mm to 100 mm, for example, 60 mm from one another. The support bars 11 form supporting areas 11A on which the material sheet 7 is deposited. The supporting areas 11A usually form grid points which may have a spacing of 5 mm to 50 mm, for example, 15 mm along the support bars 11. A support bar can have a thickness of 1 mm to 5 mm, for example, 2 mm. The supporting areas 11A thus form a grid of areas that can influence the cutting process of the material sheet 7, which lies on the supporting areas 11A. The areas of the support bars, which influence the cutting process, can moreover extend to areas, which directly adjoin the supporting areas that are in contact with the material sheet, e.g., the flanks of the support bars 11 leading to the supporting areas 11A.

FIG. 1 further shows a camera 13 arranged, for example, on the main housing 3. The camera 13 can be configured, inter alia, for image acquisition of the pallet 5A, the support bars 11 and supporting areas 11A, as well as the relative position of the material sheet 7 with respect to the pallet 5A (and possibly the support bars 11 and supporting areas 11A). The camera 13 is in connection with an image evaluation unit of the control system of the flatbed machine tool 1.

The flatbed machine tool 1 may have a local and/or cloud-based manufacturing control system for performing the methods described herein for evaluating a position of a sub-space in a planning space and/or the methods described herein for generating nesting plans. The manufacturing control system can be used to generate the evaluations and nesting plans in real time during operation of the flatbed machine tool 1. As a result, the flatbed machine tool can be provided with, for example, a nesting plan that is improved with respect to a cutting process, in particular shortly after the material sheet is placed.

Herein, cloud-based means a storage and/or data processing device, in particular one that is remote, preferably anonymized, in which data and evaluations from more than one, advantageously from several hundred or several thousand different users can be stored and/or computationally processed. This allows different users to contribute to the optimization of the process regardless of the manufacturing location. It has been recognized that the methods described achieve great success only when several hundred, in particular several thousand, in particular ten thousand, in particular several hundred thousand user evaluations have been read out. Such a quantity of data is often not achievable for a single manufacturing plant in one year. Accordingly, the method would presumably have remained uninteresting for such a manufacturing site under certain circumstances.

Several processing plans can be stored in a manufacturing executing system (MES). Order information for the industrial processing of workpieces and/or workpiece composites can be stored in the processing plans. In addition to laser cutting, the machining plans can contain other machining steps or processes, such as forming, bending, punching, heating, welding, joining, surface treatment, etc., which the workpiece can pass through in parallel or sequentially. In this way, the workpieces can pass through several processing steps in a coordinated manner and the cut edge quality can be adjusted and improved already in the overall manufacturing control. The IVIES can be configured so that processing plans of the workpieces to be produced can be created in it and processed with it. The MES can also be configured to display the status of the workpieces. This means that the IVIES can be configured to output both the sequence of processing steps and the processing steps already performed. Advantageously, the MES can additionally be configured to assign individual machining plans to the machine tools. Advantageously, the IVIES can also be configured to allow manual or automated intervention in the processing steps of a processing plan at any time. This has the advantage that during the production sequence of several different machining plans, it is possible to react very flexibly to different, in particular unexpected, events. These events can be, for example: change of priority of processing plans or production orders, a new high-priority production order, cancellation of a production order, missing material, e.g., in case of wrong delivery, failure of a machine tool, missing skilled personnel, accidents, detection of faulty quality of a manufacturing step, etc. The IVIES can be installed locally in the manufacturing plant and/or at least partially cloud-based remotely.

It can be seen that—due to the support in localized areas—process-related risks can influence the process reliability. For example, cutting paths above bars or tilting a workpiece 9 can cause damage to the support bar 11 and/or the workpiece 9 and/or a cutting head, thereby increasing the risk of reject pieces and downtime. Furthermore, damage to the support bars 11 leads to higher service costs for replacement or longer downtimes. Furthermore, in the case of removal of the support bar 11 in the supporting area 11A, the number of supporting points may be reduced, which may increase the risk of tilting of the workpieces 9. If the cutting line 10 runs in the vicinity of a supporting area 11A, there is an increased risk of a reduction in the quality of, for example, the underside of the workpiece. Also, the cutting process may stop if molten material cannot be sufficiently blown out of the gap and thus a workpiece is not completely cut off, each of which may result in more reject pieces.

Thus, the nesting methods described herein also propose a process-oriented arrangement of the workpieces 9 in the material sheet 7, which reduces the risks listed above as well as possible add-on costs due to, for example, reject pieces as well as service and breakdown of the flatbed machine tool.

Furthermore, for example, additional slug-specific aspects can be evaluated by including the positions of the supporting areas, such as a tilting probability of an inner area (slug), which was cut out of a workpiece, or the probability that a slug will drop out of the workpiece. The former can be done in nesting with the help of the mentioned evaluation procedures that assess tilting; the latter can be done, for example, by matching supported spaces with slug spaces.

FIG. 2 shows a nesting plan 21 as it can be generated with an arrangement rule in a two-dimensional planning space 23 using an algorithm. This can be a bottom (main direction)-left (secondary direction) arrangement rule. The main direction runs from right to left and the secondary direction from top to bottom in FIG. 2. The planning space 23 is set up in the area of a planning sheet 25. The planning sheet 25 is transferred to the material sheet for the cutting process in such a manner that corresponding geometry data of the planning space 23 corresponds to the machining area provided by the flat bed machine tool 1 for a workpiece sheet 7 (and the support coincides with the assumed position data of the supported spaces). In the present example, a rectangular planning space 23 is assumed to be applied to a corresponding rectangular shaped material sheet. Other shapes are possible as well.

The nesting plan is created in a planning phase preceding the cutting process. For example, the controller of the flatbed machine tool may create the nesting plan, if, for example, currently recorded position data are included in the planning. Or an independent planning unit with corresponding computing capacity may create the nesting plan, if, for example, predetermined position data are assumed and these position data are then subsequently implemented for the cutting process on the basis of appropriate positioning of the material sheet on the pallet and the support bars. The generation of the nesting plan can be a partial objective of the manufacturing control system.

The nesting plan 21 shows an overlap-free arrangement of sub-spaces 9A-9F in the two-dimensional planning space 23, where the sub-spaces 9A-9F (also two-dimensional) correspond to six different types of workpieces. The nesting plan 21 concerns in this example the generation of 50 test workpieces.

The arrangement shown is based on an insertion sequence for the total of 50 sub-spaces. An insertion sequence generally determines the sequence in which the sub-spaces are inserted one after the other into the planning space 23 during a sequential generation of the nesting plan 21. The sub-spaces are arranged here, as an example, according to a bottom-left arrangement rule (strategy) in the planning space 23.

The nesting plan 21 also schematically shows a spatial arrangement of predetermined supported spaces 27. In order to clarify the origin of the supported spaces, the supported spaces are partially combined in lines, similar to the support bars, and are only shown as points in the area of the sub-spaces 9A-9F. As already mentioned for the evaluation and nesting methods described below, position data are available, which indicate the positions of the supported spaces 27 in the planning space 23. The position data are used in particular in the evaluation of positions of the sub-spaces.

For illustration, additional cutting operation data and parameters are shown in an enlarged section of a corner of planning space 23. Each of the sub-spaces is bounded by one or more closed contours. As an example, an outer contour 31A and an inner contour 31B are drawn for sub-space 9A (highlighted by dashes). For an outer contour 31A' of sub-space 9B, an insertion point E, an approach path A, and a pressure point D are also drawn.

The exemplary sub-spaces have different sizes, but are, e.g., all small enough for the gas pressure to influence the stability of a sub-space. In the enlarged area of FIG. 2, one can see individual supported spaces 27 within the sub-space 9B. Together with the respective pressure point D and the respective center of gravity S of a sub-space, the supported spaces 27 define a susceptibility to tilting of a workpiece given by the sub-space 9B.

The nesting plan 21 shown in FIG. 2 is also based on a workpiece minimum distance. The workpiece minimum distance is determined, inter alia, by the material thickness of the material sheet to be cut, and the cutting parameters to be used. At least the workpiece minimum distance is to be given between two adjacent sub-spaces 9A-9F arranged in the planning space 23. The workpiece minimum distance lies, for example, in a range of 5 mm to 20 mm, in particular 10 mm.

For the nesting procedures described below, one can use in general arrangement rules that define how sub-spaces in the planning space are arranged spatially one after the other. This is not limited to a bottom-left strategy, such as that underlying the exemplary nesting plans shown in the figures. Rather, bottom-left-fill strategies or no-fit-polygon approaches, for example, can also be used.

Figure 3:
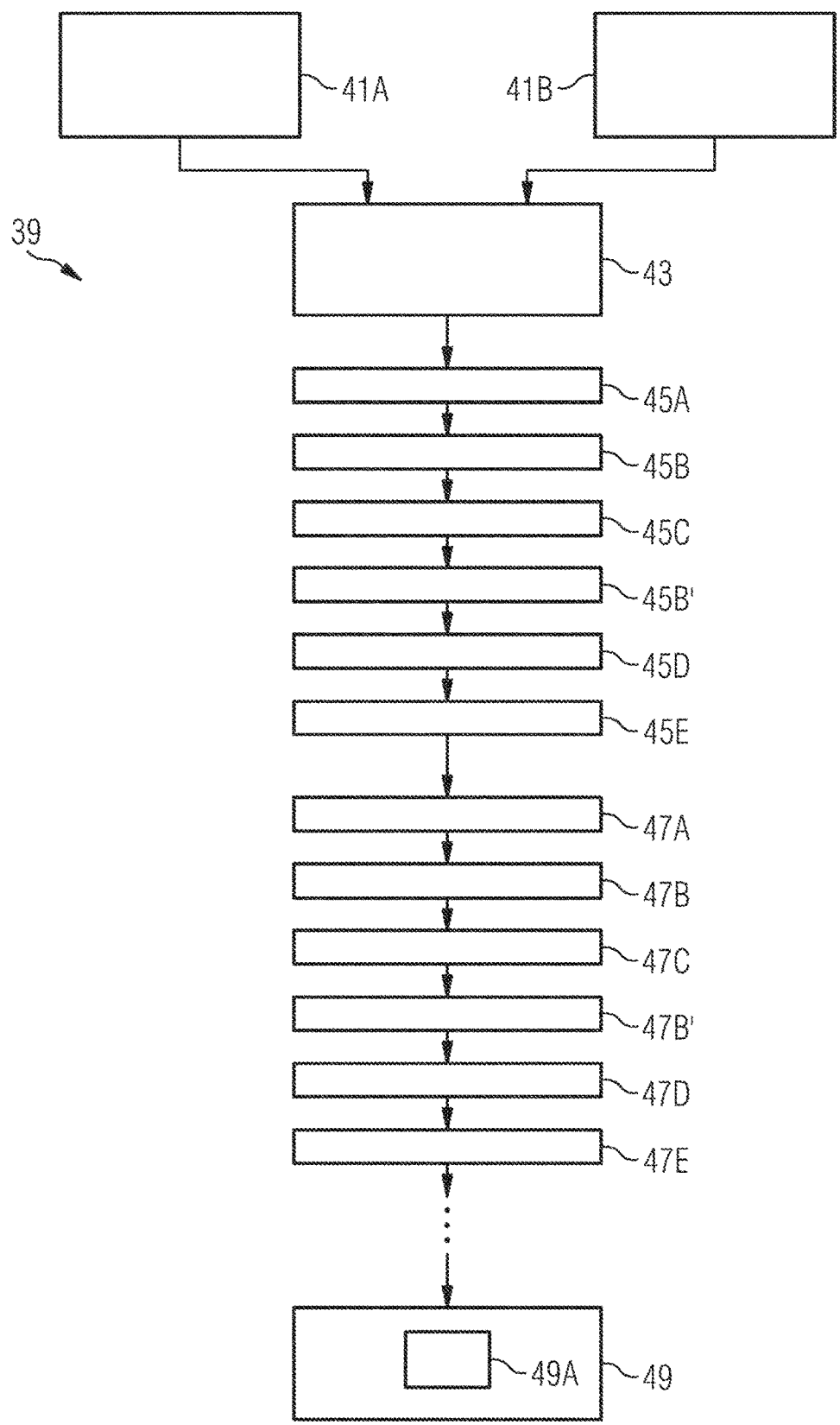
FIG. 3 a flow diagram of a method for generating a nesting plan for controlling a cutting process of a flatbed machine tool, FIG. 4A-4C schematic representations to illustrate correction possibilities of a workpiece position in a nesting plan, FIG. 5 a flowchart of a method for generating a cutting process-oriented nesting plan, FIG. 6 a schematic representation illustrating the consideration of supported spaces, FIG. 7 a schematic representation of a support bar, FIG. 8 a schematic representation of a displacement of a sub-space in the planning space to avoid overlapping with support spaces, FIG. 9 a flow diagram of a method for evaluating a position of a sub-space using position data of support spaces, FIG. 10 a sketch for illustrating the weighted calculation of a damage evaluation, FIG. 11A-11B schematic diagrams illustrating the improvement of a damage evaluation, FIG. 12 a schematic representation for illustrating the consideration of a tilting of a workpiece, FIG. 13 a schematic diagram for illustrating the consideration of internal contours.

With reference to the flowchart of a method 39 for generating a nesting plan in FIG. 3, the nesting methods proposed herein generally assume that cutting operation data (such as geometry data of the planning space, position data for the positions of the supported spaces, a plurality of sub-spaces to be arranged, and their quantity data) are provided (steps 41A, 41B) together with nesting input parameters (such as workpiece minimum distance, insertion sequence, and arrangement rule).

According to the insertion sequence and the arrangement rule, a nesting method arranges a first sub-space (sub-space) in the planning space (starting position of the first sub-space listed in the insertion sequence) in a first step 43. A position herein usually refers to a reference point of one of the sub-spaces, e.g., a center of gravity of an area corresponding to the center of mass of a cut-out workpiece (assuming a uniform thickness of the material sheet). (It is noted that, anticipating the evaluations described below, this first arrangement step, i.e., the starting position, can already be evaluated and improved accordingly by varying the position of the sub-space or other parameters).

In a series of further steps 45A, 47A . . . additional sub-spaces are now inserted in the planning space according to the insertion sequence and the arrangement rule. The arrangement rule assigns an initial position within the planning space to each newly inserted sub-space. In that initial position, at least one point of the sub-space is arranged at the workpiece minimum distance from another previously inserted sub-space.

After each new insertion of a sub-space, there are performed, e.g., a packing density evaluation and an evaluation incorporating the position data of the respective initial position of the newly inserted sub-space (step 45B, 47B, . . . ), for example, for evaluating a damage rate or a tilting behavior.

Depending on an evaluation result of the initial position of a newly inserted sub-space, at least one alternative position is identified (step 45C, 47C, . . . ). The alternative positions are again evaluated, e.g., with the at least one evaluation incorporating the position data (step 45B', 47B', . . . ).

Now the evaluation results of the initial position and the at least one alternative position are compared (step 45D, 47D, . . . ). Based on the result and specifically for the insertion sequence, one of the evaluated positions is defined as the cutting position for the newly inserted sub-space in the nesting plan (step 45E, 47E, . . . ). For a sub-space, the arrangement is completed with the definition of the cutting position and the next sub-space according to the insertion sequence is determined and inserted.

Once all sub-spaces have been added in this way according to the insertion sequence, evaluated and improved, in particular optimized, in position with respect to the position data, a nesting plan 49A has been generated that includes the sub-spaces arranged at the cutting positions. For the nesting plan 49A, an total evaluation can be formed from the evaluations of the individual sub-spaces. The nesting plan 49A can be output (for example, together with its total evaluation) or stored in a memory of the controller or the planning unit (step 49).

The alternative positions can generally be created by applying a translation and/or rotation operation to an initial position (or already generated alternative position).

Alternative positions can be created, for example, by shifting step by step by predetermined increments in one or two directions, checking in each case whether the sub-spaces are overlap-free and still lie in the planning space. The displacement can be accompanied by a rotation of the sub-space or only a rotation can be performed if, for example, the boundary condition of the overlap-free arrangement cannot be fulfilled with a pure displacement. Furthermore, the displacement may preferably be performed against a last direction underlying the arrangement rules. Alternatively, the displacement can be done along a direction in which the minimum distance to an adjacent sub-space is given (or along a direction in which the minimum distance relates to an edge contour of the planning space, which in this case is comparable to a contour of a sub-space, for example, eventually with a different minimum distance). The displacement may further be along a connecting line of centers of gravity of neighboring sub-spaces.

Figure 4A:
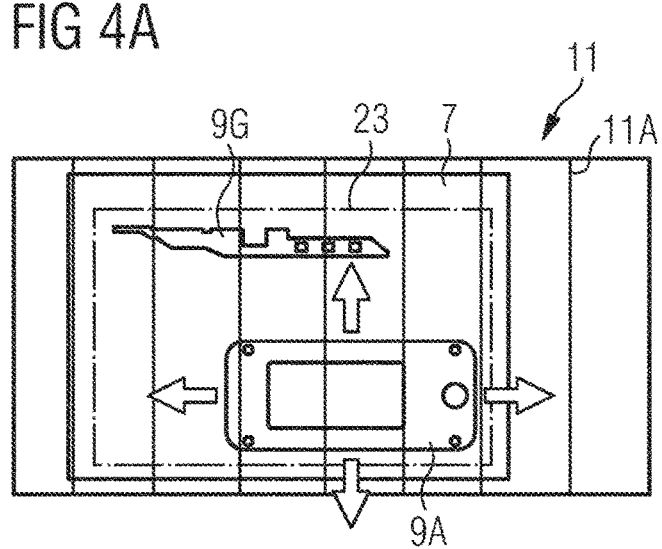
Figure 4B:
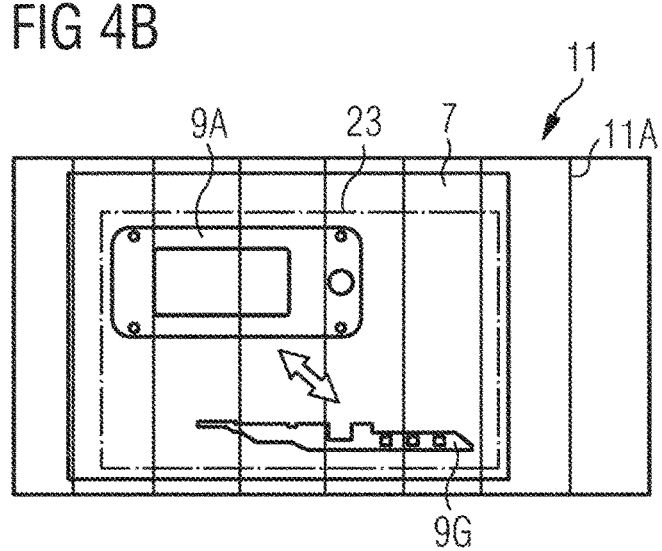
Figure 4C:
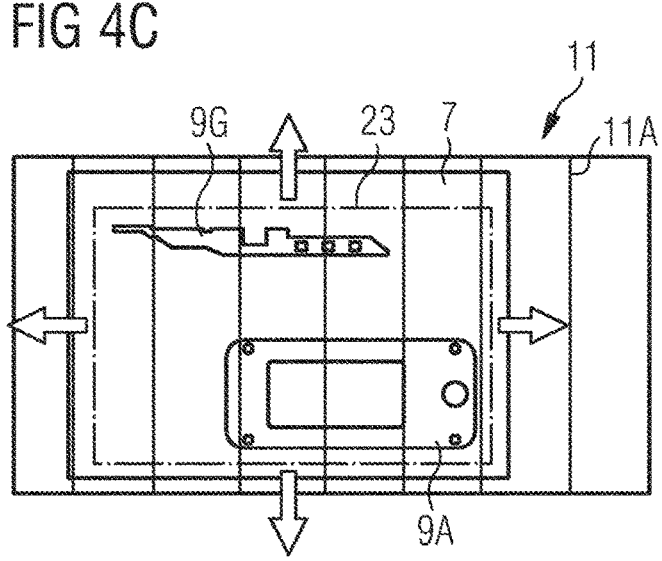

FIGS. 4A to 4C each show two sub-spaces 9A and 9G in a planning space 23 that could form the basis of a cutting plan. Furthermore, FIGS. 4A to 4C illustrate a projection of the planning space 23 onto a coordinate system of the flatbed machine tool by schematically indicating the pallet 23 with a plurality of support bars 11 and a material sheet 7. The predetermined positions of the support bars 11 define the position data of the supported spaces in the planning space 23.

FIGS. 4A and 4B illustrate ways in which the positions of the sub-spaces 9A and 9G can be varied with respect to planning space 23. For example, the sub-space 9A can be moved freely in planning space 23 (FIG. 4A) or its position can be exchanged with the position of another sub-space (FIG. 4B). Furthermore, rotational movements of a sub-space can be performed alternatively or additionally.

Furthermore, the positions of the sub-spaces 9A and 9G can be shifted with respect to the position data of supported spaces in the planning space 23. This corresponds to a variation of the projection of the planning space 23 onto the pallet 5A and thus to a change of the position data of the supported spaces in the planning space 23.

Figure 5:
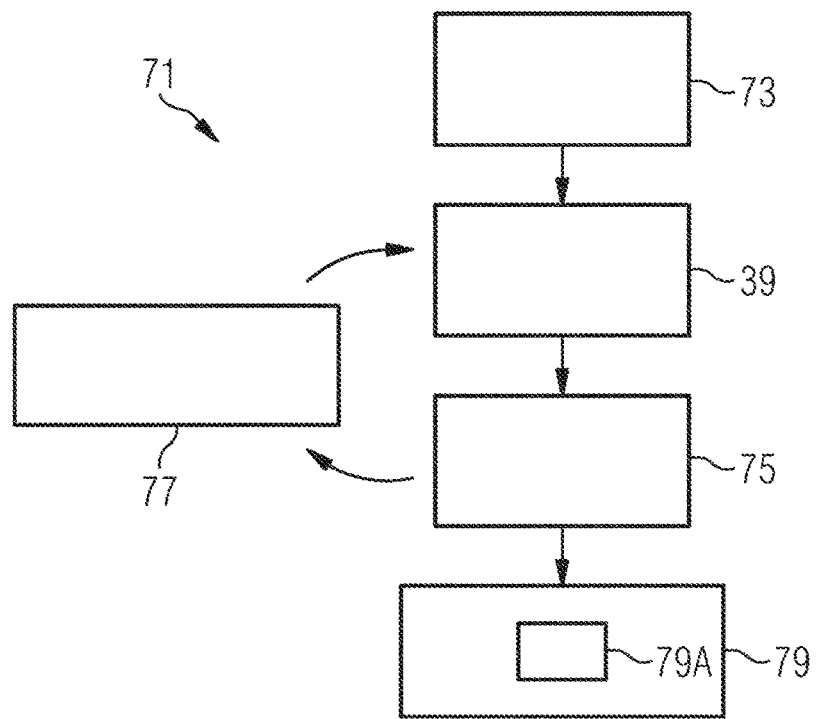

With reference to the schematic flowchart of a method 71 for nesting arbitrary sub-spaces in the two-dimensional planning space, which is shown in FIG. 5, the method for generating a nesting plan can be decomposed into an insertion sequence of sub-spaces and a fixed arrangement rule, in particular for an implementation in an algorithm. E.g., with an evolutionary algorithm, the insertion sequence of sub-spaces to be inserted can be changed with the improvement objective to achieve an insertion sequence with the best possible total evaluation value. An implementation of a nesting algorithm as an evolutionary algorithm is disclosed, for example, in "Genetic Algorithms and Grouping Problems", E. Falkenauer, New York: Wiley, 1998.

The evaluation proposed herein can implement, for example, the approach that, in order to achieve good improvements, an arrangement rule can be used that does not necessarily insert the pieces to form a densest packing, but also takes into account the position of the sub-space (workpiece) in the planning space (metal sheet, material sheet) and the position of the sub-space (workpiece) relative to the supported spaces (supporting points of the support bars).

In the flowchart shown in FIG. 5, the generation of a nesting plan in method 71 is based on a predetermined insertion order. This can be used as a data packet of an algorithm designed to improve the nesting plan by a. Checking of several data packets according to predefined selection criteria,
 b. Selection of specific data packets as a result of the check,
 c. Generation of further data packets by combining the selected data packets,
 d. Modification of further data packets, in particular according to randomly specified rules, to modified further data packets,
 e. Optional: Generation of evaluation data from an evaluation of the modified further data packages according to specified quality criteria,
 f. Optional: Generation of combined data packages from the combination of the evaluation data with the modified further data,
 g. Comparison of the quality of the combined and/or modified and/or selected data packages based on predefined quality features,
 h. Repeat steps a. through g. for the combined data packets until the comparison of quality in step g reaches a predetermined value.

In a first step 73 of the nesting procedure 71, the data packages are initialized. The initial insertion sequences can, for example, be generated stochastically or be based on empirical values.

Each of the data packages is used to generate a nesting plan (step 39), as explained, for example, in connection with FIG. 3. An evaluation is thereby built as described above on a packing density evaluation in combination with at least one evaluation incorporating the position data of the supported spaces.

Next, a comparison of total evaluations is performed for the entire amount of data packages (step 75). Based on well-assessed data packages, further data packages are generated by selection, arrangement, and combination (step 77), in order to generate—as new data packages—further nesting plans in newly carried-out step 39, to generate total evaluations in newly carried-out step 75, and to compare these total evaluations in order to repeatedly open up new data packages based thereon. In this process, selection and combination generally ensures that well-evaluated data packages have more influence on the next data packages. The evaluation and development of further combined and/or amended and/or selected data packages is continued, for example, up to a predetermined or desired quality feature. The evaluation can also be stopped when the quality improvement has reached a certain value, e.g., a further quality improvement remains below a predefined value.

The nesting plan with the then given, determined criteria fulfilling (determined as "best" for the interests at hand) total evaluation is finally output as cutting process-oriented nesting plan 79A (step 79).

FIGS. 6 to 13 refer to an exemplary evaluation approach for the evaluation of a nesting plan with regard to the influence of supported spaces on the cutting process.

Figure 6:
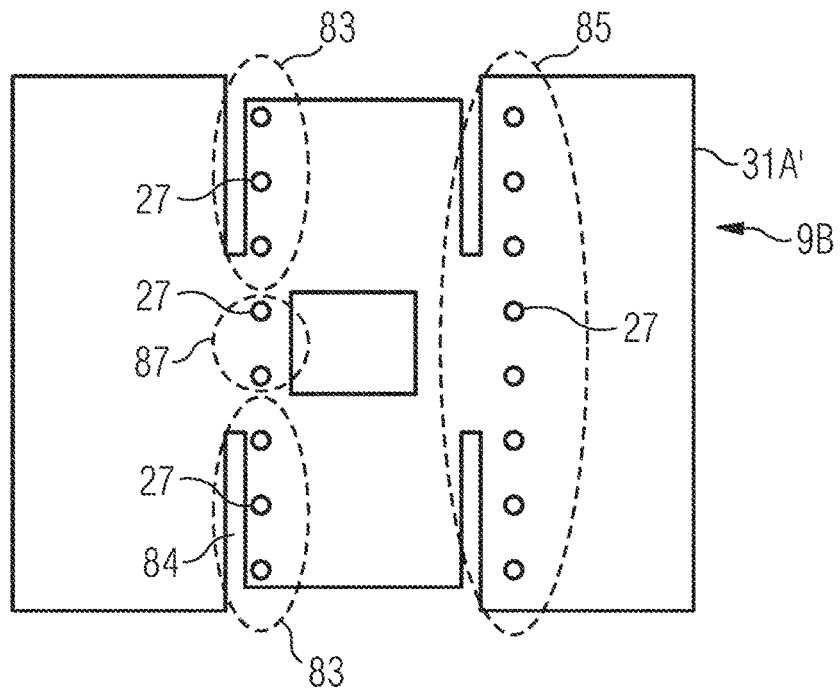

FIG. 6 shows the sub-space 9B from FIG. 2 enlarged. One can see an outer contour 31A' that bounds the sub-space 9B, as well as exemplary point-shaped supported spaces 27. Supported spaces 27 in regions 83 essentially coincide with the outer contour 31A' in the area of the cuts 84. Supported spaces 27 in a region 85 lie near the outer contour 31A' in the area of the cuts 84. Supported spaces 27 in a region 87 lie far from the outer contour 31A'. The evaluation process explained below differentiates, inter alia, the effects of the supported spaces 27 on the cutting process for such categories of relative positions between the supported space and the contour.

Figure 7:
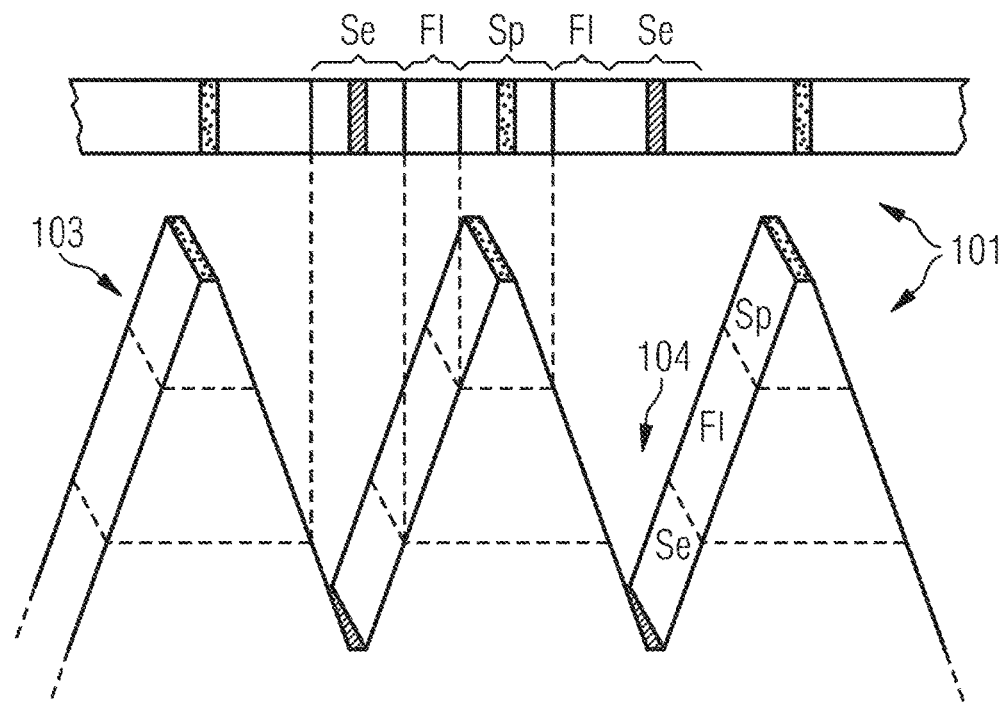

The relative positions are exemplarily illustrated in FIG. 7 with a top view of a support bar 101 and a schematic perspective view of the support bar 101, for example, by a bar structure in which supporting tips 103 are separated from each other by "V"-shaped depressions 104. The material sheet lies stationary on a plurality of supporting tips 103 during the cutting process.

Figure 8:
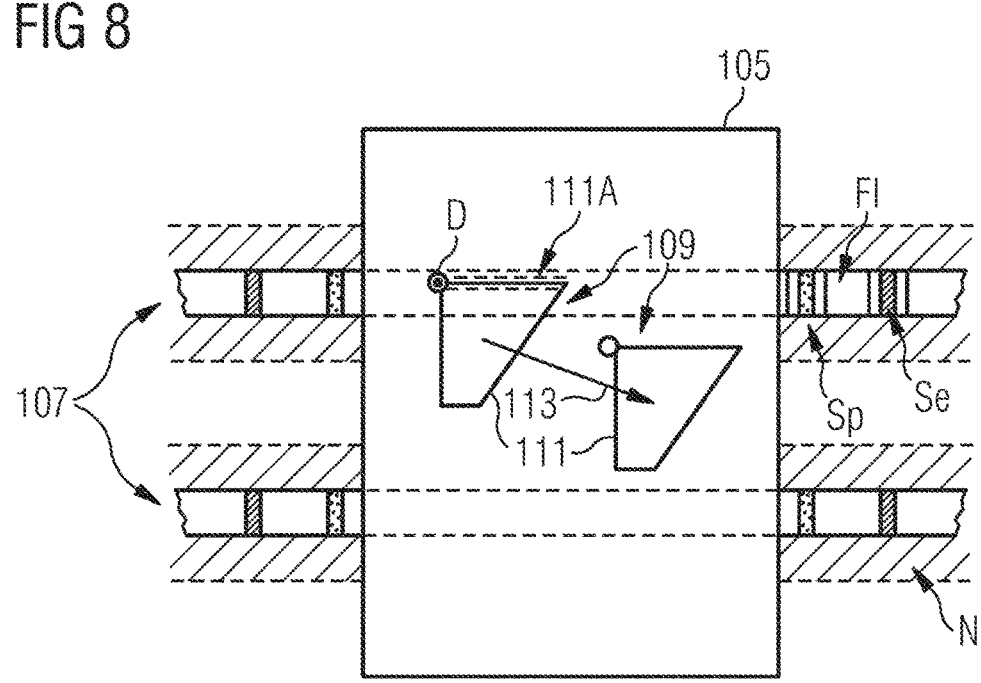

For such a support bar, FIG. 8 shows a section 105 of a planning space through which two rows 107 of (supported) spaces run, which are related to the supported spaces that could be formed, for example, by the bar structure of FIG. 7.

In the following, a method for evaluating a position of a sub-space arranged in a two-dimensional planning space is explained by way of example. The sub-space belongs to a nesting plan, which is provided for controlling a cutting process of a flatbed machine tool for cutting out workpieces from a material sheet. In general, the nesting plan includes an overlap-free arrangement of (two-dimensional) sub-spaces corresponding to the workpieces in the planning space as well as a spatial arrangement of predetermined supported spaces and support surrounding spaces. The supported spaces correspond to supported surface areas of the material sheet, which are supported during the cutting process, and the supported spaces are adjoined by support surrounding spaces.

Exemplarily, FIG. 8 shows a sub-space 109 in which the pressure point D and a section 111A of an outer contour 111 bounding the sub-space 109 extend above one of the rows 107. Additionally, FIG. 8 shows the sub-space 109 after a displacement along an arrow 113, whereby the outer contour 111 is now located between the rows 107.

For the method of evaluating a position of a sub-space, contour data (indicating a cutting contour that delimits the sub-space in the position to be evaluated in the planning space), position data (indicating the positions of spaces in the planning space to be considered in the evaluation), and cutting operation data (indicating a type of a cutting operation for at least a portion of the cutting contour) are provided. The spaces to be considered include a group of supported spaces and a group of support surrounding spaces.

Looking at FIGS. 7 and 8, several possible categories of relative positions between positions/sections of the contour and the rows of supported spaces (such as supported spaces, support surrounding spaces) can be defined as spaces in the planning space. Examples of categories from the point of view of the implementation (projection) of the nesting plan on the material sheets are:

supported (tip space SP as example for a supported space), next to a support tip 103 and at a small distance above the surface of the support, e.g., above the support bar 101 (flank space Fl as example for a support surrounding space, in particular a (near) support overlay space, which includes a structure that lies under the material sheet not too far away), between the supporting tips 103 and with a large distance above the surface of the support (sink space Se as example for a support surrounding space, in particular a (far) support overlay space, which includes a structure that lies under the material sheet somewhat further away), and near/directly next to a support bar 101 (near space N as further example for a support surrounding space, however without a structure lying under the material sheet, herein also referred to as support clearance space).

The spaces Sp, Fl, Se from the planning space are also indicated in the physical representation of the support bar shown in FIG. 7 for illustration. Similarly, the positions of the tips and valleys are also indicated schematically in the planning space.

Using the example of a flatbed machine tool that has—for supporting the material sheet—a pallet with a plurality of support bars, each support bar having a plurality of bar tips, the support surrounding spaces can include both support overlay spaces, which correspond to regions of the material sheet that lie above a support bar during the cutting process, and support clearance spaces, which correspond to regions of the material sheet that do not lie above a support bar during the cutting process. According to the method, the cutting contour can then be divided into sections, which lie in a support overlay space, and sections, which lie in a support clearance space; and contour section lengths can be determined for each of the sections using the position data, the contour data, and the cutting operation data. For example, for the section of a contour in a space, the length can be determined along the course of the contour. For a non-linear course, an approximation of the section length can be made, for example, by decomposing the section into a plurality of linear subsections, or it can be based on the distance between the entry point and exit point of the contour into or out of the space. Further, for example, for an entry point, the length can be determined in binary terms as being in a space or not in a space. The contour section lengths can then be included in the calculation of the damage rate for the cutting contour with appropriate weight factors.

Figure 9:
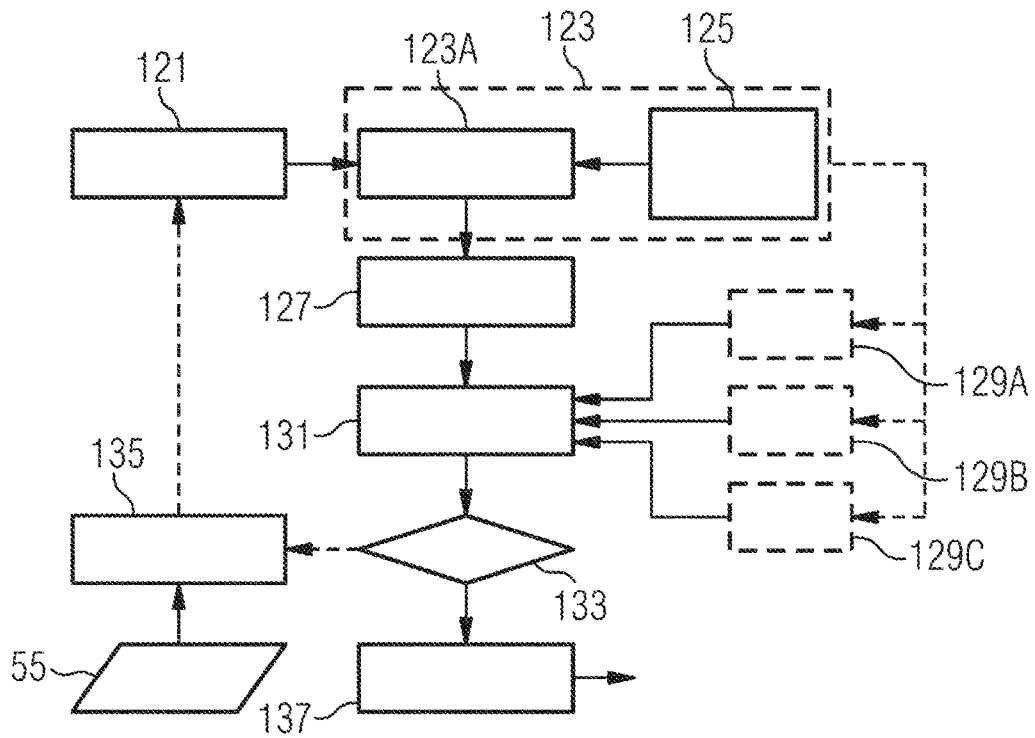

FIG. 9 shows an exemplary sequence of an evaluation of a position of a sub-space, the evaluation incorporating position data; i.e., relative positions between spaces (in particular groups of spaces) of the support and a sub-space are taken into account. The evaluation procedure of the nesting plan defined in the planning space or its sub-spaces concerns—in the implementation—the cutting process of an arrangement of workpieces on a material sheet, which are to be cut out with a flatbed machine tool according to workpiece-specific cutting contours. The flatbed machine tool has, for example, a pallet with a plurality of support bars for supporting the material sheet, each support bar having a plurality of bar tips on which the material sheet lies stationary during the cutting process.

If a material sheet is placed on the pallet, position data of the material sheet with respect to the pallet can be determined, whereby the planning space can be derived from a spatial arrangement of the material sheet; in the planning space, the supported spaces, support overlay spaces, and support clearance spaces are then defined.

It is thus assumed that position data indicating the positions of the support spaces, in particular the supported spaces, in the planning space are known. In the implementation of the nesting plan, this means that either the material sheet is to be aligned accordingly on the bar tips of the pallet or that position data of the material sheet with respect to the pallet are determined before the method is carried out. In general, positions of the support bars, the bar tips with respect to the pallet and/or with respect to the material sheet are thus recorded and/or provided. Possibly, additional arrangement data regarding the arrangement of the planning sheet on the material sheet are measured or predetermined or given for the projection.

The method shown in FIG. 9 can be carried out as partial step in the method for generating the nesting plan of the sub-spaces (contours of the sub-spaces correspond to the later cutting lines) for a cutting process. In the method, a damage rate for a to be evaluated position of a contour of a sub-space is determined. For this purpose, supported space-near (i.e., bar-near) sections of the contour are examined and subdivided, for example, into the above space categories Sp, Fl, Se, N. This includes, inter alia, subdividing in spaces that would lie above or next to a support bar when implementing the nesting plan.

To calculate the damage rate of a contour, cumulative contour section lengths are determined using the position data, the contour data, and the cutting operation data, as generally disclosed herein. Each of the cumulative contour section lengths is specific to a type of a cutting operation and a group of spaces, and corresponds to a cumulative length of the sections of the cutting contour each within the corresponding group of spaces. I.e., all (cutting) contours of a sub-space are examined and evaluated with respect to the positions of spaces in the planning space, which are to be considered for the evaluation. For this purpose, the sections, which are all located in spaces of the same group of spaces (for example, all in supported spaces) and to which the same cutting type is assigned, are considered together and together result in the cumulative contour section length for the respective group and the respective cutting type.

The damage rate for the cutting contour in the position to be evaluated is calculated by combining the contour section lengths in a weighted manner with weight factors that define a damage probability depending on the respective group of spaces and on the respective cutting process (for example, make an estimate based on test measurements).

Taking FIGS. 7 and 8 as an example, in order to calculate the damage rate of a contour, the spaces are provided with weight factors which define a damage probability of the support bars depending on the areas and cutting types. Weights can also be applied to the cutting process if several cutting types are used, which can be differentiated, for example, according to the laser power applied. Cutting types may involve incision cutting, approaching the contour, and cutting along the contour. As used herein, and approaching process refers to a (reduced) approaching of the cutting process. This can be performed to ensure a process-safe transition from the position to selected cutting parameters at the cutting process. The approaching process is usually carried out on the basis of sets of rules, whereby the cutting parameters can possibly already be set along a cutting line section, which is not yet part of the cutting contour of the sub-space. In particular, one starts with an adapted (reduced) feed rate and possibly further modified cutting parameters, and then performs an adaptation to the standard parameters in accordance with the set of rules, at which adapted parameters the desired interaction with the material of the material sheet is affected.

For a sub-space, an evaluation value for the to be evaluated position of the sub-space is then determined using the calculated damage rate of the cutting contour.

Using the evaluation values of all sub-spaces, an evaluation value of the nesting plan based on the calculated damage rates of the contours can be output accordingly. Furthermore, the evaluation value of a sub-space can be used in a nesting method for elevation of a position of a sub-space and for improvement of the same.

This basic concept is reflected in the flowchart in FIG. 9. The evaluation starts with the placement of a sub-space in a position to be evaluated in the planning space (step 121). Depending on the state in the nesting method, this can be, for example, the starting position of the first sub-space, an initial position or an alternative position.

In step 123, the individual positions of the contour of the sub-space are examined. In particular, the intersection of the contour of the sub-space with the support spaces (Sp, Fl, Se, N) is formed (step 123A) and corresponding positions of the contour are stored. If additional cutting types are provided with the contour (step 125), the individual positions can further be associated with the addressed cutting types.

Figure 10:
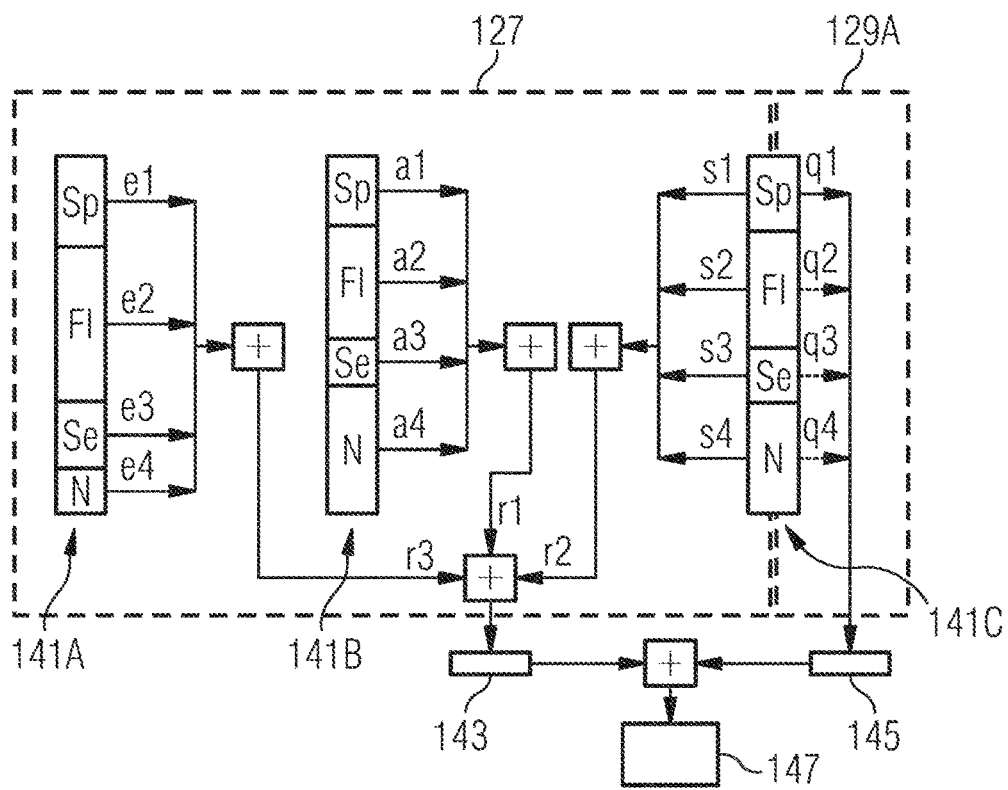

Based on this, bar damage values, for example as explained below in connection with FIG. 10, are calculated (step 127).

If further position-dependent evaluations are to be taken into account, for example a quality of a workpiece (step 129A), a tilt evaluation (129B), or a slug analysis (129C), these can also be included in an evaluation value (step 131) that is stored for the to be evaluated position of the sub-space.

A test is then performed to determine whether a further position is to be evaluated (step 133). If this is the case—for example, if not all alternative positions have been tested—an alternative position can be selected (step 135) and fed into the evaluation method as the position to be evaluated in step 121.

Once all positions have been tested, the one with the most suited evaluation value is selected and output as a cutting position, for example (step 137). The next sub-space is now inserted in accordance with the arrangement rule and its initial position becomes the position to be evaluated. This is continued until all sub-spaces in the insertion sequence have been inserted. All evaluation values together then form the total evaluation value of the resulting nesting plan.

Referring to steps 123A to 127 of FIG. 9 and FIGS. 7 and 8, in a method for evaluating the position of a sub-space, sections of the cutting contour or positions along the cutting contour are assigned to the groups of spaces for the supported spaces Sp using the position data. The evaluation value of the to be evaluated position of the sub-space is determined depending on the extent of the assigned sections of the cutting contour or positions along the cutting contour for the supported space. For the evaluation of the to be evaluated position of the sub-space, sections of the cutting contour or positions along the cutting contour are assigned to additional support spaces (the support surrounding spaces Fl, N, Se) with the help of the position data. Cumulative contour section lengths for these support spaces can thus be determined depending on the extent of the sections of the cutting contour or positions along the cutting contour assigned to the additional support spaces. The cumulative contour section lengths of the supported spaces Sp and the additional support spaces Fl, N, Se can be combined with weights to derive the evaluation value for the to be evaluated position of the sub-space.

Furthermore, in the method, incision data associated with cutting contours and indicating an incision process and optionally an approaching process for the cutting contour, as well as cutting operation data for the incision process and optionally the approaching process, can be specified and used. For example, the number of incisions in a group (the cumulative contour section length of incision processes is also referred to herein in simplified terms as the number of incisions) and optionally approaching section lengths can be determined for the groups of spaces, respectively, using the position data, the incision data, and the cutting operation data. The numbers of incisions and optionally the approaching cut lengths can be included in the calculation of the damage rate for the cutting contour with corresponding weight factors.

Furthermore, for the evaluation of a position to be evaluated, an evaluation of a workpiece quality can be performed, which is included in the evaluation value for the to be evaluated position of the sub-space. The evaluation of the workpiece quality depends, for example, on the contour section length of the supported spaces because the cutting process in particular can be influenced by the support and can affect the quality of the workpiece.

Furthermore, for the evaluation of a position to be evaluated, a tilt evaluation can be performed, which is included in the evaluation value for the to be evaluated position of the sub-space and which includes a calculation of distances between a center of gravity of the sub-space and supported spaces, which overlap with the sub-space.

If a sub-space has an outer contour and a closed inner contour, which lies within the outer contour, an analysis of a support for an inner space of the inner contour can also be carried out for the evaluation of a position to be evaluated; the analysis is included in the evaluation value for the to be evaluated position of the sub-space and includes a calculation of an overlap of the inner contour with supported spaces and optionally with support overlay spaces.

FIG. 10 gives an example of calculations on which step 127 (damage risk calculation) and step 129A (workpiece quality calculation) are based. The cutting types of incision (bar 141A), approach with reduced power (bar 141B), and cutting (bar 141C) were considered. In the three bars 141A, 141B, 141C, according to the intersection formation in step 123A of FIG. 11, positions (contribution) of the contour are summarized, which are assigned to the spaces Sp, Fl, Se, N. The height of each area in the bars correspond, respectively, to cumulative contour cut lengths for the respective groups of spaces. Each type of support space Sp, Fl, Se, N is assigned cutting type-specific weight factors e1-e4, a1-a4, s1-s4. With these weights, the points on the contour are included in the support space-specific evaluation. Weight factors r1-r3 can also be assigned to the cutting types, which flow into the cutting type-specific combination. In this way, a bar damage evaluation value 143 can be determined for the damage risk.

Furthermore, for the positions on the contour that are assigned only to cutting (bar 141C), for example, a quality of the workpieces resulting from the positions of the sub-space can be evaluated. For this purpose, supported space-specific weight factors q1-q4 are used so that a quality evaluation value 145 of a workpiece can be determined for the quality of the workpiece. This can be combined with the bar damage evaluation value 143 to form a total evaluation value 147 of the contour and thus of the sub-space.

It can be seen that sections of the contour or positions along the contour are assigned to the supported spaces 27 (tip spaces Sp) with the aid of the position data for evaluating a sub-space positioned in an alternative position 46. An evaluation value of the to be evaluated position of the sub-space is then determined depending on the extent of the assigned sections of the contour or positions along the contour for the supported space.

In addition to the supported spaces 27, further support spaces Fl, N, Se can be identified in the planning space. Sections of the contour or positions along the contour can also be assigned to these using the position data to evaluate a sub-space positioned in an alternative position 46.

Evaluation values for the support spaces Fl, N, Se are determined depending on the extent of the sections of the contour assigned to the further support spaces or the positions along the contour. Accordingly, the evaluation values of the supported spaces and the further support spaces can be combined with weights to obtain an evaluation value for a to be evaluated position of the sub-space.

In general, the weights may depend on an energy input value, and a weight may be larger (e.g., a maximum value) for a cutting operation in the bar tip space. Lower weights may be used for a cutting operation in the bar flank space, for a cutting operation in the bar sink space, and for a cutting operation in the space near/directly adjacent to the row of said spaces.

Figure 11A:
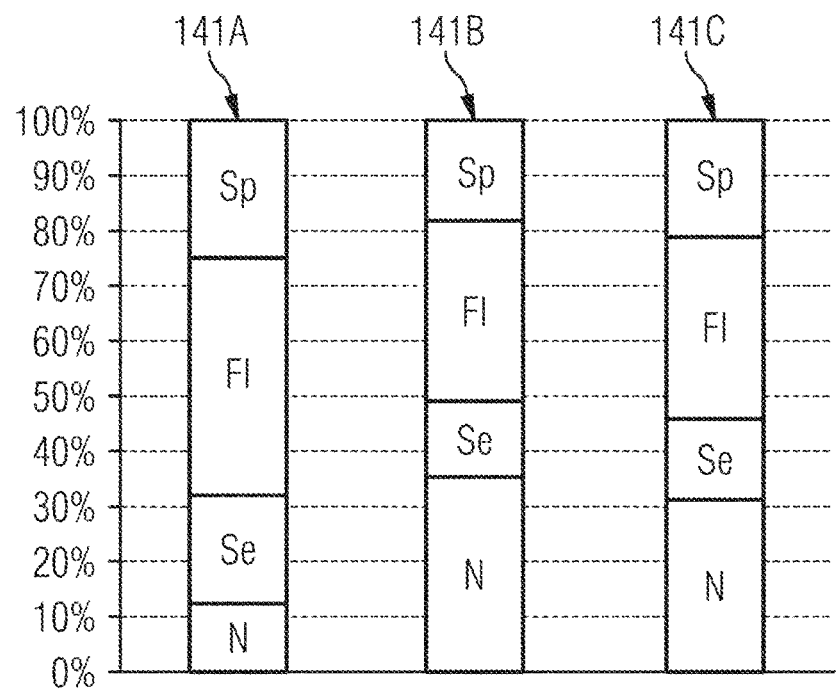
Figure 11B:
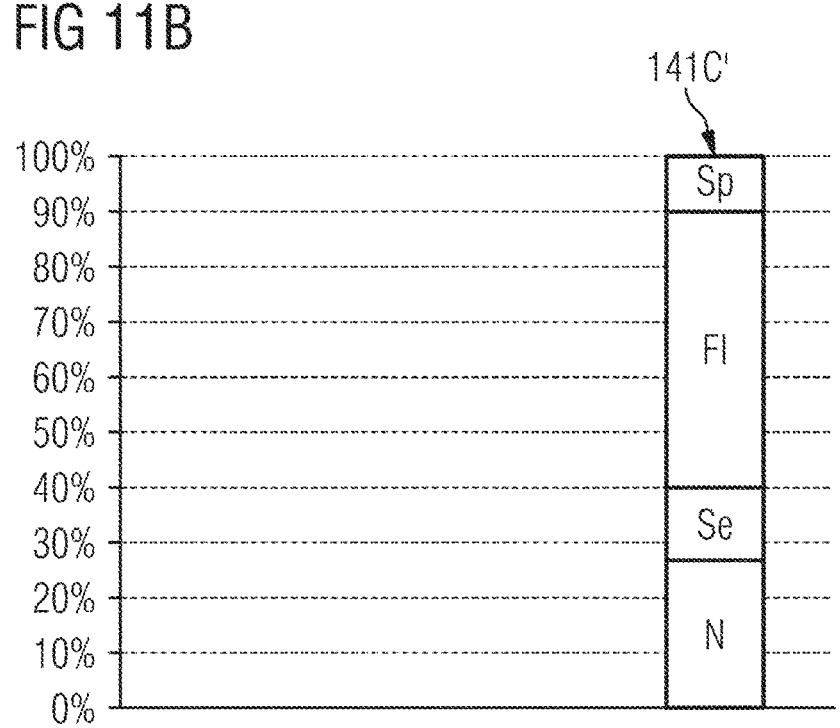

FIGS. 11A and 11B show the effect of improving a position of a sub-space having, for example, a plurality of inner contours and an outer contour; using the evaluation method described herein. FIG. 11A shows the situation according to the example in FIG. 10 with bars 141A, 141B, 141C for the cutting types incision, approaching with reduced power, and cutting. It can be seen that all groups of spaces (supported spaces and support surrounding spaces as well as their (sub-) groups near and far support overlay spaces as well as support clearance spaces) are assigned to contour sections. That is, the contour of the sub-space in the position to be evaluated extends exemplarily in all spaces to be considered in the evaluation. In other words, the cutting plan provides that the workpiece belonging to the sub-space is cut out with incision processes, approaching processes, and cutting operations over bar tip spaces SP, the flank spaces Fl, bar sink spaces Se, and near spaces N.

After an improvement of the position of the sub-space with regard to the supported spaces, there is a new position with an improved evaluation value. As shown in FIG. 11B, the contour of the sub-space in the new position no longer has any sections in the spaces that are assigned to the cutting types incision and approaching with reduced power. Only sections of the contour remain in the spaces assigned to the cutting type cutting (bar 141C'). The latter may be due, for example, to the fact that the workpiece to be produced is larger than the distance between two support bars.

For the cutting type cutting, it was additionally possible to improve the cumulative contour section lengths. As can be seen in bar 141C', for example, the portion of the contour above the bar tips was reduced and the portion of the contour above the bar flanks was increased. Accordingly, more favorable cumulative contour section lengths are obtained for the four groups of spaces, so that on the one hand the damage rate could be reduced and on the other hand the workpiece quality was increased.

Figure 12:
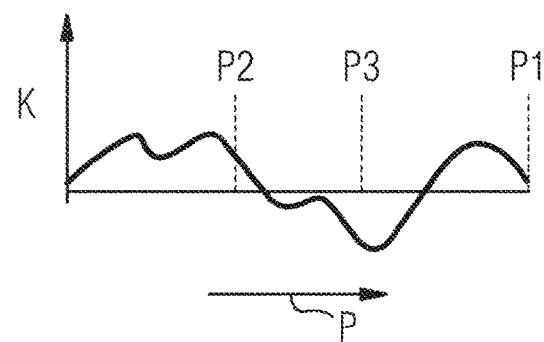
Figure 12:
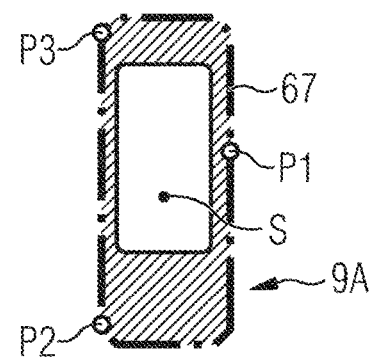

FIG. 12 illustrates a mechanical tilt analysis for different positions of the pressure point on a contour 67 of a sub-space 9A. In such a tilt analysis, in particular the position data of the supported spaces are used to perform a calculation of distances between a center of gravity of the sub-space and supported spaces that overlap with the sub-space.

As an example, FIG. 12 shows in a diagram a curve of a tilting probability K over positions P of the pressure point on the contour 67 of the sub-space 9A, and specifically assuming a fixed position of the sub-space 9A with respect to the supported spaces. In the diagram, one can see an extended stable area (low tilting probability), e.g., at position P2, and an unstable area (increased tilting probability) around position P3. Position P1 can neither be assigned the property "stable" nor the property "unstable".

The tipping probability can be incorporated as a parameter in the determination of the evaluation value for the to be valued position of the sub-space.

Figure 13:
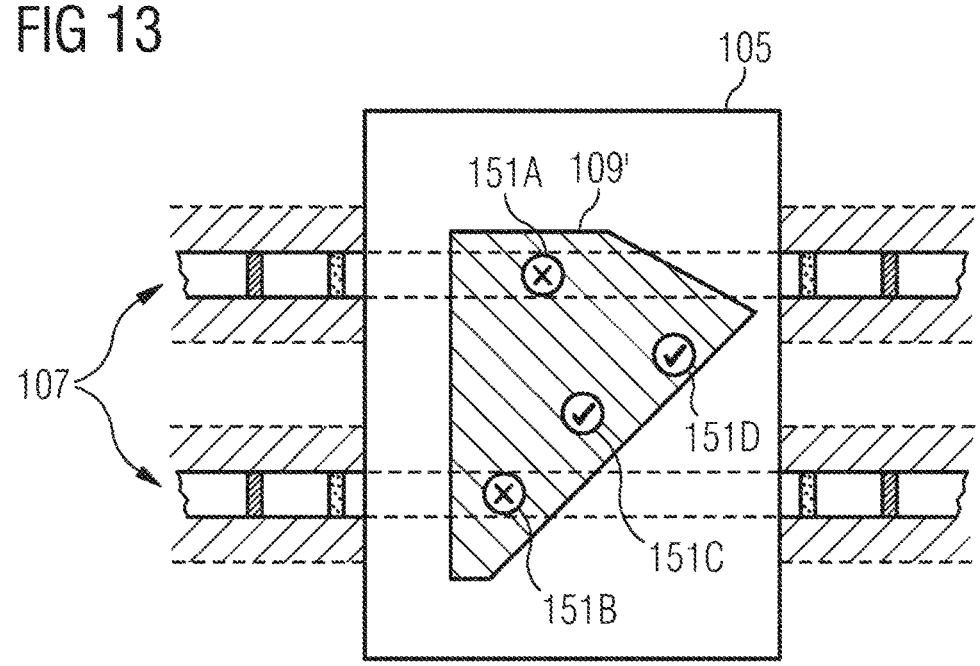

In FIG. 13, interior contours 151A-151D in a sub-space 109' are shown in a section 105 of a planning space. It is illustrated for different positions of slugs how the overlap of slugs with spaces can influence the evaluation value of a to be evaluated position of a sub-space. This is because if inner contours overlap, for example, with bar tip spaces or bar flank spaces, the dropping out of slugs can be impaired.

It can be seen that the inner contours 151A and 151B (marked with a cross as undesirable) would be cut out when implementing the cutting plan with the sub-space 109' above support bars. If inner contours in general overlap in particular with supported spaces or support overlay spaces, the dropping out of slugs can be influenced by the nearby support structures.

In contrast, the inner contours 151C and 151D of the sub-space 109' (marked with a check mark as admissible) do not overlap with spaces such as the bar tip spaces, bar flank spaces, and bar sink spaces; i.e., there are no support structures below the slugs when the cutting plan is implemented because the slugs are cut out in-between support bars. The slugs can thus fall out undisturbed.

Such an overlap evaluation can be performed for an inner contour and be included in the evaluation value for the to be evaluated position of the sub-space. The overlap evaluation can use the position data of supported spaces and optionally support overlay spaces.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for evaluating a position of a selected sub-space of a nesting plan, the nesting plan being provided for controlling a cutting process of a flatbed machine tool for cutting out workpieces from a material sheet, the nesting plan including an overlap-free arrangement of respective sub-spaces, the respective sub-spaces corresponding to the workpieces, in a two-dimensional planning space and an arrangement of predetermined supported spaces and support surrounding spaces, the supported spaces corresponding to respective support surface areas of the material sheet, which are supported during the cutting process, the method comprising:

providing:
contour data specifying a cutting contour that delimits the selected sub-space in the position to be evaluated within the planning space,
position data indicating respective positions in the planning space of spaces to be considered in the evaluation, wherein the spaces include a group of supported spaces and a group of support surrounding spaces, and
cutting operation data indicating a type of cutting operation for at least one section of the cutting contour,
determining cumulative contour section lengths using the position data, the contour data, and the cutting operation data, wherein each of the cumulative contour section lengths indicates, for a type of cutting operation and a group of spaces, a cumulative length of sections of the cutting contour, the sections each lying within the corresponding group of spaces,
calculating a damage rate for the respective cutting contour in the position to be evaluated by combining the contour section lengths in a weighted manner with weight factors, the weight factors defining a damage probability depending on the respective group of spaces and the respective type of cutting operation,
determining an evaluation value for the position to be evaluated of the selected sub space using the calculated damage rate of the cutting contour, and
generating the nesting plan based on the evaluation values and controlling the cutting process of the flatbed machine tool for cutting out workpieces from the material sheet according to the nesting plan.

2. The method according to claim 1, wherein the flatbed machine tool includes a pallet configured to support the material sheet, the pallet having a plurality of support bars each having a plurality of bar tips, and
the support surrounding spaces include support overlay spaces, which correspond to regions of the material sheet that overlie a support bar during the cutting process, and support clearance spaces, which correspond to regions of the material sheet that do not overlie a support bar during the cutting process, and the method further comprising the steps of:
subdividing the cutting contour into sections that lie in a support overlay space and sections that lie in a support clearance space,
determining a contour section length for the support overlay spaces and the support clearance spaces, respectively, using the position data, the contour data, and the cutting operation data, and
including the contour section length for the support overlay spaces and the support clearance spaces in the calculation of the damage rate for the cutting contour with corresponding weight factors.

3. The method of claim 2, wherein providing the position data comprises:
detecting positions of support bars and/or of bar tips of a pallet, which is provided for use with the flatbed machine tool and provides a support area in which the material sheet can be supported, wherein the step of detecting positions includes:
assigning the supported spaces to regions above the bar tips,
assigning the support overlay spaces to regions above bar depressions, wherein the bar depressions can optionally be further subdivided into regions of bar tip flanks and bar tip sinks, to which respective near and far support overlay spaces are assigned, and
assigning the support clearance spaces to border regions, which laterally adjoin a support bar and extend along the bar tip and/or along the bar depression.

4. The method according to claim 2, further comprising:
depositing a material sheet on the pallet and determining position data of the material sheet with respect to the pallet, wherein the planning space is derived from a spatial arrangement of the material sheet, in which the supported spaces, support overlay spaces and the support clearance spaces are defined.

5. The method according to claim 1, further comprising:
assigning sections of the cutting contour or positions along the cutting contour to the groups of spaces with the aid of the position data, and
determining the evaluation value of the to be evaluated position of the selected sub-space depending on the extent of the assigned sections of the cutting contour or positions along the cutting contour.

6. The method according to claim 5, further comprising:
providing additional support spaces in the planning space and assigning to the additional support spaces sections of the cutting contour or positions along the cutting contour with the aid of the position data for evaluating the to be evaluated position of the selected sub-space,
determining cumulative contour section lengths for the support spaces in dependence of the extent of the sections of the cutting contour or the positions along the cutting contour that are assigned to the additional support spaces, and
combining the cumulative contour section lengths of the supported spaces and the additional support spaces with weights to obtain the evaluation value for the to be evaluated position of the selected sub-space.

7. The method according to claim 1, further comprising:
providing incision data, associated with the cutting contours, indicating an incision process and/or an approaching process for the cutting contour, and cutting process data for the incision process and/or the approaching process, determining the number of incisions and/or an approaching section length for the groups of spaces, respectively, as respective cumulative contour section lengths using the position data, the incision data, and the cutting operation data, and including the number of incisions and/or the approaching section length in the calculation of the damage rate for the cutting contour with the respective weight factors.

8. The method according to claim 1, further comprising performing a quality evaluation of the workpieces that is included in the evaluation value for the to be evaluated position of the selected sub-space and which depends on the contour section length for the supported spaces.

9. The method according to claim 1, further comprising performing a tilt evaluation that is included in the evaluation value for the to be evaluated position of the selected sub-space and that includes a calculation of distances between a center of gravity of the selected sub-space and supported spaces that overlap with the selected sub-space.

10. The method according to claim 1, wherein the sub-space has an outer contour and a closed inner contour that lie within the outer contour, the method further comprising:

performing an overlap evaluation for the inner contour, which is included in the evaluation value for the to be evaluated position of the selected sub-space and which includes a calculation of an overlap of the inner contour with supported spaces and/or with support overlay spaces.

11. A method for determining a nesting plan of sub-spaces, the nesting plan being provided for controlling a cutting process of a flatbed machine tool for cutting out workpieces from a material sheet and including an overlap-free arrangement of sub-spaces, which correspond to the workpieces, in a two-dimensional planning space and a spatial arrangement of predetermined supported spaces and support surrounding spaces, the supported spaces corresponding to support surface areas of the material sheet, which are supported during the cutting process, and the method comprising:

calculating, by performing the method according to claim 1, evaluation values for positions of the sub-spaces in the nesting plan.

12. A method for determining a nesting plan, wherein the nesting plan includes an overlap-free arrangement of sub-spaces, which correspond to workpieces to be manufactured, in a two-dimensional planning space and a spatial arrangement of predetermined supported spaces and support surrounding spaces, and wherein the nesting plan is provided for controlling a cutting process of a flatbed machine tool, wherein the flatbed machine tool has a pallet with a plurality of support bars, each support bar having a plurality of bar tips, for supporting a material sheet, and is configured for cutting out the workpieces from a material sheet, the method comprising:

placing the material sheet on the bar tips of a pallet of the flatbed machine tool and determining position data of the material sheet with respect to the pallet, detecting positions of the support bars and/or the bar tips with respect to the pallet and/or the material sheet in order to provide position data of spaces in the planning space to be considered in the evaluation, wherein:

regions above bar tips are assigned to supported spaces corresponding to support surface areas of the material sheet, regions above bar depressions are assigned to support overlay spaces, and border regions, which adjoin laterally a support bar and extending adjacent to a support bar along the bar tip and/or along the bar depression, are assigned to support clearance spaces, providing arrangement data relating to the arrangement of the planning space on the material sheet, and determining the nesting plan by positioning the sub-spaces in positions that are evaluated according to the method of claim 1.

13. The method according to claim 12, further comprising positioning the sub-spaces in positions that have locations and/or orientations in the planning space, which differ in predetermined variation ranges.

14. The method according to claim 12, wherein the sub-spaces are positioned in positions to be evaluated by moving and/or rotating sub-spaces in the planning space, varying the arrangement of the planning space on the material sheet, varying position data of the material sheet with respect to the pallet, varying an incision position of an incision process and/or an approach cutting line of an approaching process for at least one sub-space, and/or exchanging positions of two sub-spaces in the planning space.

15. The method according to any claim 12, wherein the detection of the position data of the support bars and/or the bar tips is performed by:

a sensor system of the flatbed machine tool, wherein at least one subgroup of the support bars and/or the bar tips is detected and optionally the positions of non-detected support bars and/or bar tips are calculated by interpolation, an optical sensor system based on at least one of the following methods: an image processing method based on a surface image acquisition, a laser light section method, a strip light projection method, a light field camera, and a time-of-flight (TOF) camera, and/or an ultrasonic sensor system including ultrasonic sensors.

16. The method according to claim 12, wherein the weight factors depend on an energy input value that occurs in a cutting process according to the cutting plan into a support bar in the region of the bar tips, wherein a weight factor for a cutting process in a space above a bar tip is maximum and lower weight factors are provided respectively for a cutting process above a bar tip flank, for a cutting process above a bar tip sink, and for a cutting process in the border region.

17. A manufacturing method for cutting out workpieces with a flatbed machine tool according to workpiece-specific cutting contours from a material sheet, the manufacturing method comprising:

performing a method according to claim 12 in real time during operation of the flatbed machine tool, wherein the calculations for determining the improved nesting plan are performed by a local and/or cloud-based manufacturing control system, and performing the cutting operation based on the improved nesting plan.

18. A manufacturing system, comprising:

a flatbed machine tool for cutting out workpieces from a material sheet according to workpiece-specific cutting contours, and a local and/or cloud-based manufacturing control system configured to perform a method according to claim 12 in real time during operation of the flatbed machine tool to provide a nesting plan improved with respect to a cutting process of the flatbed machine tool to the flatbed machine tool.

* * * * *